United States Patent
Brueck et al.

(10) Patent No.: US 10,410,222 B2
(45) Date of Patent: Sep. 10, 2019

(54) MESSAGING SERVICE FOR PROVIDING UPDATES FOR MULTIMEDIA CONTENT OF A LIVE EVENT DELIVERED OVER THE INTERNET

(75) Inventors: David F. Brueck, Saratoga Springs, UT (US); Loren D. Larsen, Lindon, UT (US); Thomas G. McNeill, Orem, UT (US); Douglas T. Parrish, Alpine, UT (US)

(73) Assignee: Dish Technologies L.L.C., Englewood, CO (US)

( * ) Notice: Subject to any disclaimer, the term of this patent is extended or adjusted under 35 U.S.C. 154(b) by 1217 days.

(21) Appl. No.: 12/508,449

(22) Filed: Jul. 23, 2009

(65) Prior Publication Data

US 2011/0022471 A1    Jan. 27, 2011

(51) Int. Cl.
*G06Q 30/02* (2012.01)

(52) U.S. Cl.
CPC ......... *G06Q 30/02* (2013.01); *G06Q 30/0264* (2013.01)

(58) Field of Classification Search
USPC .......................................................... 705/14
See application file for complete search history.

(56) References Cited

U.S. PATENT DOCUMENTS

| | | |
|---|---|---|
| 4,535,355 A | 8/1985 | Arn et al. |
| 5,935,206 A | 8/1999 | Dixon et al. |
| 5,953,506 A | 9/1999 | Kalra et al. |
| 6,195,680 B1 | 2/2001 | Goldszmidt et al. |
| 6,366,614 B1 | 4/2002 | Pian et al. |
| 6,490,627 B1 | 12/2002 | Kalra et al. |
| 6,574,591 B1 | 6/2003 | Kleiman et al. |
| 6,604,118 B2 | 8/2003 | Kleiman et al. |
| 6,801,786 B1 | 10/2004 | Korpela |
| 6,973,081 B1 | 12/2005 | Patel |
| 6,976,090 B2 | 12/2005 | Ben-Shaul et al. |
| 7,046,630 B2 | 5/2006 | Abe et al. |
| 7,206,872 B2 | 4/2007 | Chen |
| 7,240,100 B1 | 7/2007 | Wein et al. |
| 7,474,832 B2 | 1/2009 | Boston et al. |

(Continued)

FOREIGN PATENT DOCUMENTS

| | | |
|---|---|---|
| JP | 2006237673 | 9/2006 |
| WO | 2008116305 A1 | 10/2008 |

OTHER PUBLICATIONS

Pathan, Al-Mukaddim, et al., "A Taxonomy and Survey of Content Delivery Networks", Australia, Feb. 2007. Available at http://www.gridbus.org/reports/CDN-Taxonomy.pdf.

(Continued)

*Primary Examiner* — Patricia H Munson
(74) *Attorney, Agent, or Firm* — Lorenz & Kopf LLP

(57) ABSTRACT

Messaging services for providing updates for multimedia content delivered over the Internet for a live event. In one embodiment, a messaging server provides real-time updates for multimedia content of a live event delivered over the Internet to multiple media players that request the multimedia content over the Internet. In one embodiment, the real-time updates indicate when the multimedia content is available for delivery over the Internet. In another embodiment, the real-time updates can be used to dynamically insert advertisement markers for advertisement breaks in the multimedia content.

26 Claims, 11 Drawing Sheets

(56) References Cited

U.S. PATENT DOCUMENTS

| | | |
|---|---|---|
| 7,523,181 B2 | 4/2009 | Swildens et al. |
| 7,584,495 B2 | 9/2009 | Hannuksela et al. |
| 7,603,022 B2 | 10/2009 | Putterman et al. |
| 7,620,390 B2 | 11/2009 | Vezza et al. |
| 7,624,412 B2 | 11/2009 | McEvilly et al. |
| 7,739,239 B1 | 6/2010 | Cormie et al. |
| 7,770,200 B2 | 8/2010 | Brooks et al. |
| 8,181,206 B2 | 5/2012 | Hasek |
| 8,238,725 B2 | 8/2012 | Demas et al. |
| 8,532,171 B1 | 9/2013 | Narayanan et al. |
| 8,681,680 B2 | 3/2014 | Mao et al. |
| 8,776,151 B2 | 7/2014 | Major et al. |
| 8,787,975 B2 | 7/2014 | Kanojia et al. |
| 8,832,724 B2 | 9/2014 | Major et al. |
| 8,832,757 B2 | 9/2014 | Major et al. |
| 8,925,023 B2 | 12/2014 | Major et al. |
| 8,990,328 B1 | 3/2015 | Grigsby et al. |
| 9,049,484 B2 | 6/2015 | Major et al. |
| 9,071,484 B1 | 6/2015 | Truax |
| 9,071,873 B2 | 6/2015 | Major et al. |
| 9,100,700 B2 | 8/2015 | Major et al. |
| 2002/0046405 A1 | 4/2002 | Lahr |
| 2002/0053078 A1* | 5/2002 | Holtz et al. ............ 725/14 |
| 2002/0124258 A1 | 9/2002 | Fritsch |
| 2002/0152318 A1 | 10/2002 | Menon et al. |
| 2003/0014684 A1 | 1/2003 | Kashyap |
| 2003/0018966 A1 | 1/2003 | Cook et al. |
| 2003/0058707 A1* | 3/2003 | Dilger et al. ............ 365/200 |
| 2003/0070167 A1* | 4/2003 | Holtz et al. ............ 725/32 |
| 2003/0151753 A1 | 8/2003 | Li et al. |
| 2003/0154239 A1 | 8/2003 | Davis et al. |
| 2003/0204519 A1 | 10/2003 | Sirivara et al. |
| 2003/0208767 A1 | 11/2003 | Williamson et al. |
| 2004/0003101 A1 | 1/2004 | Roth et al. |
| 2004/0003400 A1 | 1/2004 | Carney et al. |
| 2004/0083283 A1 | 4/2004 | Sundaram et al. |
| 2004/0103444 A1 | 5/2004 | Weinberg et al. |
| 2004/0163115 A1 | 8/2004 | Butzer |
| 2005/0002337 A1 | 1/2005 | Wang et al. |
| 2005/0108414 A1 | 5/2005 | Taylor et al. |
| 2005/0120107 A1 | 6/2005 | Kagan et al. |
| 2005/0188051 A1 | 8/2005 | Sneh |
| 2005/0191033 A1 | 9/2005 | Ishido |
| 2005/0233694 A1 | 10/2005 | Enari et al. |
| 2005/0275752 A1 | 12/2005 | Li et al. |
| 2005/0289618 A1 | 12/2005 | Hardin |
| 2006/0020984 A1 | 1/2006 | Ban et al. |
| 2006/0053078 A1 | 3/2006 | Yamamoto et al. |
| 2006/0080718 A1 | 4/2006 | Gray et al. |
| 2006/0117090 A1 | 6/2006 | Schellingerhout et al. |
| 2006/0206246 A1 | 9/2006 | Walker |
| 2006/0287912 A1* | 12/2006 | Raghuvamshi ............ 705/14 |
| 2007/0036516 A1 | 2/2007 | Kahn et al. |
| 2007/0083667 A1 | 4/2007 | Cooper |
| 2007/0107019 A1 | 5/2007 | Romano et al. |
| 2007/0118857 A1 | 5/2007 | Chen et al. |
| 2007/0124245 A1 | 5/2007 | Sato et al. |
| 2007/0127377 A1 | 6/2007 | Brocke et al. |
| 2008/0005505 A1 | 1/2008 | Maegawa |
| 2008/0013919 A1 | 1/2008 | Boston et al. |
| 2008/0092168 A1 | 4/2008 | Logan et al. |
| 2008/0127284 A1 | 5/2008 | Kouniniotis |
| 2008/0151758 A1 | 6/2008 | Weinrib et al. |
| 2008/0201748 A1 | 8/2008 | Hasek et al. |
| 2008/0219151 A1 | 9/2008 | Ma et al. |
| 2008/0310825 A1 | 12/2008 | Fang et al. |
| 2008/0320159 A1 | 12/2008 | Naimark et al. |
| 2009/0025027 A1 | 1/2009 | Craner |
| 2009/0074380 A1 | 3/2009 | Boston et al. |
| 2009/0080582 A1 | 3/2009 | Loeffler et al. |
| 2009/0080864 A1 | 3/2009 | Rajakarunanayake |
| 2009/0100457 A1 | 4/2009 | Lee et al. |
| 2009/0106082 A1 | 4/2009 | Senti et al. |
| 2009/0144285 A1 | 6/2009 | Chatley et al. |
| 2009/0144416 A1 | 6/2009 | Chatley et al. |
| 2009/0150956 A1 | 6/2009 | Van De Leur et al. |
| 2009/0164642 A1 | 6/2009 | Foti |
| 2009/0187948 A1 | 7/2009 | Malik |
| 2009/0193481 A1 | 7/2009 | Huang |
| 2009/0265426 A1 | 10/2009 | Svendsen et al. |
| 2009/0282162 A1 | 11/2009 | Mehrotra et al. |
| 2010/0017820 A1 | 1/2010 | Thevathasan et al. |
| 2010/0070858 A1 | 3/2010 | Morris et al. |
| 2010/0114921 A1 | 5/2010 | Bocharov et al. |
| 2010/0131671 A1 | 5/2010 | Kohli et al. |
| 2010/0153227 A1 | 6/2010 | Medvinsky et al. |
| 2010/0153237 A1 | 6/2010 | LaJoie et al. |
| 2010/0192174 A1 | 7/2010 | Hejna, Jr. |
| 2010/0205049 A1* | 8/2010 | Long .............. G06Q 30/02 705/14.5 |
| 2010/0228975 A1 | 9/2010 | Lipka et al. |
| 2010/0242079 A1 | 9/2010 | Riedl et al. |
| 2010/0250549 A1 | 9/2010 | Muller et al. |
| 2010/0250633 A1 | 9/2010 | Hannuksela et al. |
| 2010/0251289 A1 | 9/2010 | Agarwal et al. |
| 2010/0306655 A1 | 12/2010 | Mattingly et al. |
| 2010/0319044 A1 | 12/2010 | Agans et al. |
| 2011/0035507 A1 | 2/2011 | Brueck et al. |
| 2011/0083144 A1 | 4/2011 | Bocharov et al. |
| 2011/0107379 A1 | 5/2011 | Lajoie et al. |
| 2011/0126248 A1 | 5/2011 | Fisher et al. |
| 2011/0138431 A1 | 6/2011 | Cedervall et al. |
| 2011/0173345 A1 | 7/2011 | Knox et al. |
| 2011/0179385 A1 | 7/2011 | Li et al. |
| 2011/0188439 A1 | 8/2011 | Mao et al. |
| 2011/0200304 A1 | 8/2011 | Rutledge |
| 2011/0225315 A1 | 9/2011 | Wexler et al. |
| 2011/0296048 A1 | 12/2011 | Knox et al. |
| 2012/0054312 A1 | 3/2012 | Salinger |
| 2012/0079546 A1 | 3/2012 | Kalidindi et al. |
| 2012/0128061 A1 | 5/2012 | Labrozzi et al. |
| 2012/0144302 A1 | 6/2012 | Campanotti et al. |
| 2012/0174157 A1 | 7/2012 | Stinson, III et al. |
| 2012/0219273 A1 | 8/2012 | McWilliams |
| 2012/0265806 A1 | 10/2012 | Blanchflower et al. |
| 2012/0293605 A1 | 11/2012 | Seferian et al. |
| 2012/0317655 A1 | 12/2012 | Zhang et al. |
| 2012/0324489 A1 | 12/2012 | Greenfield |
| 2012/0331106 A1 | 12/2012 | Ramamurthy et al. |
| 2013/0013688 A1 | 1/2013 | Wang et al. |
| 2013/0013704 A1 | 1/2013 | Pope et al. |
| 2013/0089142 A1 | 4/2013 | Begen et al. |
| 2013/0097309 A1 | 4/2013 | Ma et al. |
| 2013/0111606 A1 | 5/2013 | Gu |
| 2013/0142499 A1 | 6/2013 | Major et al. |
| 2013/0145392 A1 | 6/2013 | Major et al. |
| 2013/0145408 A1 | 6/2013 | Major et al. |
| 2013/0145410 A1 | 6/2013 | Major et al. |
| 2013/0145411 A1 | 6/2013 | Major et al. |
| 2013/0145415 A1 | 6/2013 | Major et al. |
| 2013/0159544 A1 | 6/2013 | Cooper |
| 2013/0254341 A1 | 9/2013 | Ramakrishnan |
| 2013/0254538 A1 | 9/2013 | Orsini et al. |
| 2014/0165116 A1 | 6/2014 | Major et al. |
| 2014/0189099 A1 | 7/2014 | Hurst et al. |
| 2014/0189143 A1 | 7/2014 | Muhlestein |
| 2014/0233585 A1 | 8/2014 | Beers et al. |
| 2014/0237510 A1 | 8/2014 | Phillips et al. |
| 2014/0237534 A1 | 8/2014 | Salinger et al. |
| 2014/0250473 A1 | 9/2014 | Braness et al. |
| 2014/0317652 A1 | 10/2014 | Tam |
| 2015/0312597 A1 | 10/2015 | Major et al. |
| 2015/0358858 A1 | 12/2015 | Xue |

OTHER PUBLICATIONS

USPTO "International Search Report" dated Dec. 12, 2008; International Appln. No. PCT/US2008/061035, filed Apr. 21, 2008.

Tvede, Lars et al. "The Five Basic Formats of Data Broadcasting" Data Broadcasting: Merging Digital Broadcasting with the Internet, 2001.

(56) References Cited

OTHER PUBLICATIONS

USPTO, Office Action in U.S. Appl. No. 15/392,241 dated Nov. 1, 2017.

* cited by examiner

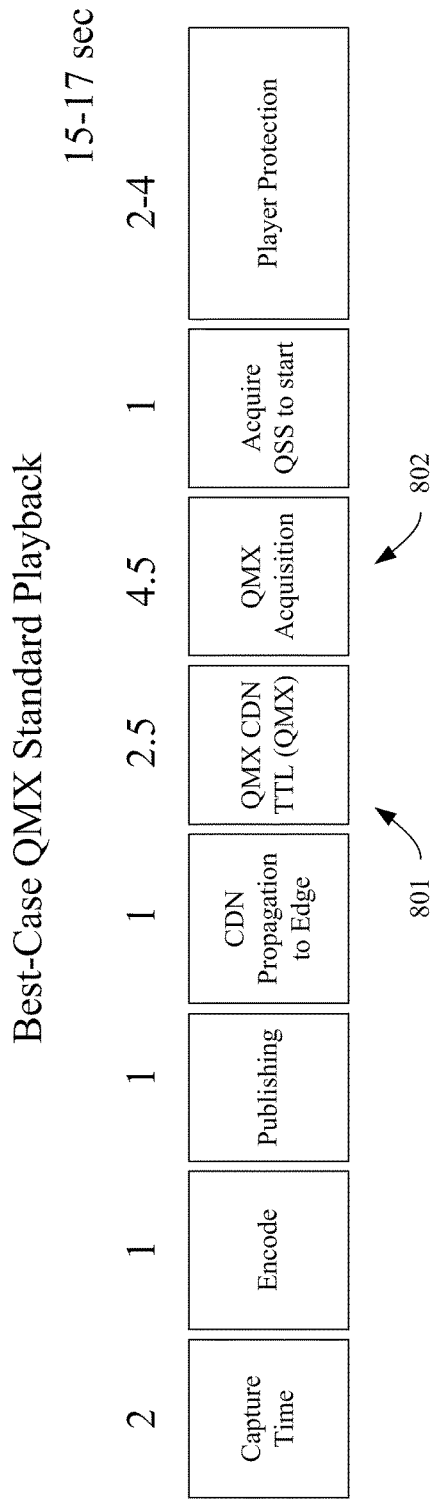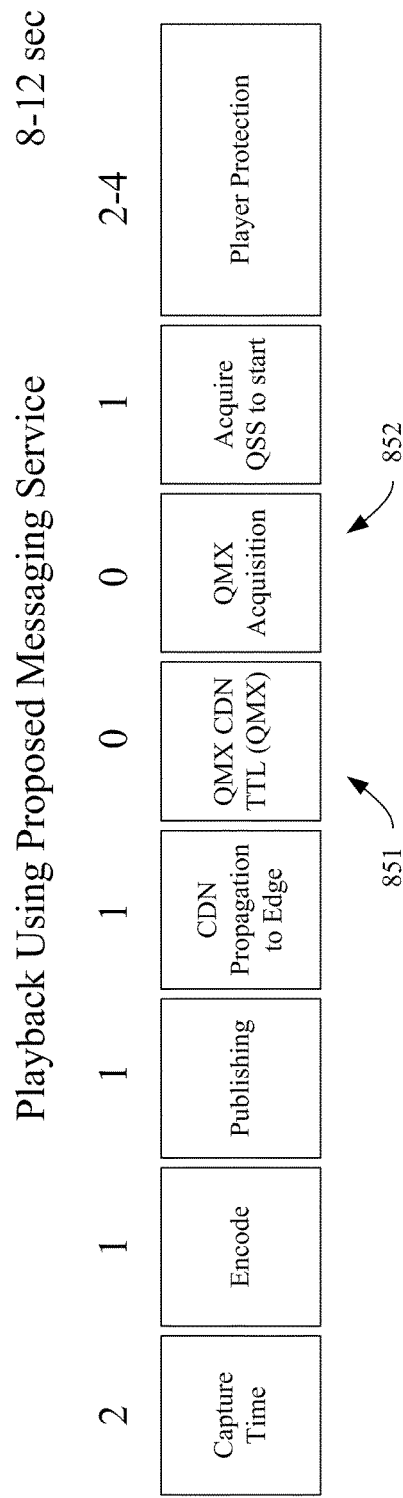

MESSAGING SERVICE FOR PROVIDING UPDATES FOR MULTIMEDIA CONTENT OF A LIVE EVENT DELIVERED OVER THE INTERNET

TECHNICAL FIELD

Embodiments of the invention relate to the field of delivery of multimedia content over the Internet; and more specifically, to messaging service for providing updates for multimedia content of a live event delivered over the Internet.

BACKGROUND

The Internet is becoming a primary method for distributing multimedia content (e.g., video and audio or audio) and other information to end users. It is currently possible to download music, video, games, and other multimedia information to computers, cell phones, and virtually any network capable device. The percentage of people accessing the Internet for multimedia content is growing rapidly. The quality of the viewer experience is a key barrier to the growth of video viewing on-line. Even with current capacity and demand, performance can be uneven, with streams starting slowly, stopping unexpectedly, and audio tracks not always synchronizing well with video. Many of these issues can be traced to the unpredictable nature of the Internet and uncertain capacity at the consumer access level. Consumer expectations for online video are set by their television and movie viewing experiences. Appointment TV and "live" event broadcasts, whether distributed over the air, via cable, or through satellite, attract very large audiences.

Audience numbers for streaming video of a "live" event on the web are rapidly growing, and there is a growing interest and demand for viewing live events on the Internet, referred to as online live event viewing or web TV. Streaming of data files or "streaming media" refers to technology that delivers sequential multimedia content at a rate sufficient to present the multimedia to a user at the originally anticipated playback speed without significant interruption. Unlike downloaded data of a multimedia file, streamed data may be stored in memory until the data is played back and then subsequently deleted after a specified amount of time has passed. In this context, "live" means that the multimedia content is anchored to a particular point in time for playing the multimedia content. That is, particular pieces of multimedia content of the live event are played by a media player according to a schedule of the live event; for example, the beginning of the video is scheduled to be played by the media player at a particular point in time.

Streaming multimedia content of live events (e.g., Appointment TV, live broadcast events, etc.) over the Internet have some challenges, as compared to regular broadcasts over the air, satellite, or cable. One concern that arises in the context of distribution of multimedia content over the Internet, regardless of the method used for delivering, is how to update the schedule for playback of a live event in real time or near real time; for example, how to update content durations and start and end times for advertisements during the live event. Conventional broadcasting of live or scheduled events does not have this concern because the broadcaster is in complete control of timing of duration of the video, and the insertion and playback of advertisements in the broadcasted video. For example, if a 30-second advertisement, which has been selected and scheduled beforehand, is to be inserted into the output signal at the precise instant that it is called for, with very high reliability, and the advertisement starts and ends immediately at the scheduled time. In addition, all viewers see or hear the same advertisement at the same point in the multimedia content, such as that of a live event. The viewers are human beings who watch or listen to the multimedia content using a television or radio.

In one conventional approach for streaming live events, a publisher inserts advertisements into the live video stream of a live event, effectively controlling the video stream being encoded itself, before being delivered by a specialized media server. This approach does not allow for real-time or near real-time updates to the schedule of the live event because the advertisements are effectively part of the original multimedia content stream. Moreover, there is frequently a need to replace the original scheduled broadcast advertisements of the live event with Internet advertisements because of broadcast rights of the live event, and because of the lack of ability for the publisher to charge for advertisement delivery over the Internet. Using this approach, all viewers watching the live event see the same Internet advertisement at the same time, but the publisher cannot control how many viewers see the advertisements. In general, there is no good way to take advantage of knowing how many viewers see the advertisements. In particular, it is difficult or impossible to be paid a higher price if a higher-than-expected number of viewers sees the advertisements. In addition, using this approach, it is difficult or impossible to target advertising to particular demographics or geographic areas without setting up one or more specialized media servers for each demographic or geographic area and ensure that each viewer connects to the appropriate media server to watch the live event. These conventional approaches do not have the ability to provide real-time or near real-time updates to the schedule of a live event, for example, to perform advertisement insertion in real or near real time.

BRIEF DESCRIPTION OF THE DRAWINGS

The invention may be best understood by referring to the following description and accompanying drawings that are used to illustrate embodiments of the invention. In the drawings:

FIG. 8A is a graphical representation of a best-case playback time using standard playback.

FIG. 8B is a graphical representation of an estimated playback time using the messaging service according to one embodiment.

DETAILED DESCRIPTION

Figure 1A:
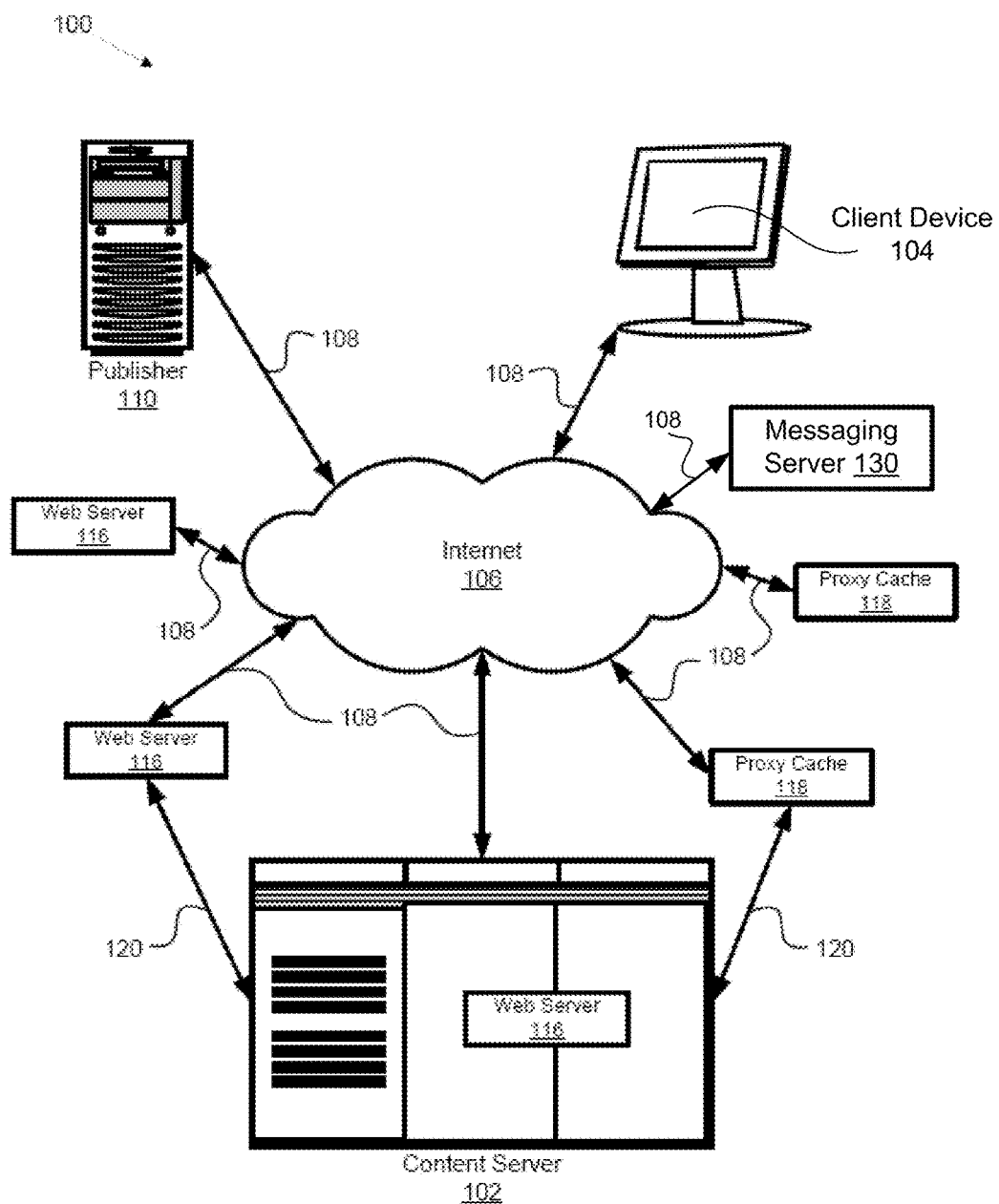
FIG. 1A is a schematic block diagram illustrating one embodiment of a computing environment in which a messaging server of the present embodiments may be employed.

The following description describes embodiments of a messaging service for providing updates for multimedia content for a live event delivered over the Internet. In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. Many of the functional units described in this specification have been labeled as modules, engines, or managers, in order to more particularly emphasize their implementation independence. For example, a module may be implemented as a hardware circuit comprising custom integrated circuits or gate arrays, off-the-shelf semiconductors such as logic chips, transistors, or other discrete components. A module, engine, or manager may also be implemented in programmable hardware devices such as field programmable gate arrays, programmable array logic, programmable logic devices, or the like. These modules, engines, and managers may also be implemented in software for execution by various types of computing devices. An identified module of executable code may, for instance, include one or more physical or logical blocks of instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The embodiments described herein are directed at providing updates for multimedia content of a live event delivered over the Internet. In one embodiment, a messaging server provides real-time updates for multimedia content of a live event delivered over the Internet to multiple media players that request the multimedia content over the Internet. The media player may be a piece of software that plays the multimedia content (e.g., displays video and plays audio), and may be a standalone software application, a web browser plug-in, a combination of browser plug-in and supporting web page logic, or the like. In one embodiment, the real-time updates indicate when the multimedia content is available for delivery over the Internet. In another embodiment, the real-time updates can be used to dynamically insert advertisement markers for advertisement breaks in the multimedia content. It should be noted that the multimedia content is data that when processed by the media player (operating on an electronic device) allows the media player to present a visual and/or audio representation of the live event to a viewer (i.e., user of the media player). For example, the live event may be a television broadcast, such as of a sporting event, a live performance, a live news report, or the like. The live event may also have pre-recorded content intermingled with the live multimedia content, such as slow-motion clips of important events within the live event (e.g., replays), which are played in between the live telecast. More importantly than the type of broadcast, the live event is scheduled to be played at a particular point in time according to a schedule of the live event.

At times, the schedule of a live event changes, for example, the start time or duration of a live event may be changed in real time. In addition, a live event may change when advertisement breaks are scheduled to occur during the live event. The embodiments described may provide real-time or near real-time updates to media players that are streaming multimedia content of a live event over a pull-based network, using, for example, Hypertext Transfer Protocol (HTTP). These updates can provide real-time control information for the multimedia content, such as updated content durations of the multimedia content (which indicate which portions of the content is available for delivery) and advertisement markers for advertisements breaks in the multimedia content. The embodiments described herein may prevent media players from requesting multimedia content that is not yet available for delivery, avoiding error codes that would prevent the multimedia content from being requested by a client device, and avoiding those error codes from being cached which prevents other media players within the same hierarchy from requesting the multimedia content until the error code in the cache expires.

In one embodiment, a messaging server provides real-time updates for multimedia content of a live event delivered over the Internet. When the multimedia content has been encoded and stored, for example, on an origin content server associated with a content delivery network (CDN), the messaging server receives information that indicates when the encoded multimedia content is available for delivery by the CDN, for example, when the encoded multimedia content is stored on the origin content server associated with the CDN. In one embodiment, the messaging server monitors the origin content server to determine when the encoded multimedia content is available for delivery. In another embodiment, an encoder notifies the messaging server when the encoder has finished encoding and storing the multimedia content on the origin content server. In another embodiment, a publishing system receives the information from the encoder and generates an update for the multimedia content. For example, the publishing system may be a content management system (CMS), as described herein, which generates a timeline for the multimedia content, and allows a user to modify the timeline to insert advertisements, start times, content durations, etc. The timeline may indicate when the multimedia content is available for delivery over the Internet to be requested by the media player, and may indicate when the media player should play the multimedia content. For example, the timeline may specify a starting time of the multimedia content, and a current duration of the multimedia content to allow playback of the multimedia event of the live event according to the schedule. In the example above, the encoder is currently updating the CMS with information about streams to indicate that certain portions of the stream have been sent to the origin content server associated with the CDN. Based on the received information, the CMS generates either an update to be sent to the messaging server, which pushes the update to the subscribed media players. The update can be an updated timeline or an update to be used by the media player to update a previously-generated timeline.

In addition, a user of the publishing system can insert dynamically markers on the multimedia content indicating that they would like to insert an advertisement break of a specified duration to indicate when to start an advertisement break in the live event program or when to return from the advertisement break to the main program. In one embodiment, these advertisement marks are used to construct an updated timeline (labeled herein as virtual timeline or a QVT). Although the QVT can be delivered by the CDN, given current reasonable CDN caching times, the QVT may not propagate all the way to the media player in time for the advertisement break to be seen when the media player is operating a short-time behind live. In another embodiment, the messaging server can send update messages with advertisement marks. The update message sent over the connections to the media players may indicate the time of the advertisement break (corresponding to the actual time of the live event, also referred to as house time), and the duration of the advertisement break. The media player can interpret the update message, and determine how to populate the advertisement break with advertisements based on a policy (e.g., for this program a 90-second advertisement break is to be filled with three thirty-second advertisements retrieved from an Advertisement Decision Service (ADS)). The media player retrieves and plays the advertisements and resumes the program at their conclusion. In another embodiment, the update message can also be used for end-of-advertisement markers to allow the media player to know when to return to the live event. The media player may return to the live event after completion of the advertisements or before completing playout of the advertisements in their entirety so that user does not miss the start of the multimedia content after the advertisements.

FIG. 1A is a schematic block diagram illustrating one embodiment of a computing environment 100 in which a messaging server 130 of the present embodiments may be employed. The computing environment 100 includes a content server 102 (also referred to as a media server) and a client device 104. The content server 102 and the client device 104 may be coupled by a data communications network. The data communications network may include the Internet 106 and network connections 108 to the Internet 106. Alternatively, the content server 102 and the client device 104 may be located on a common Local Area Network (LAN), Personal area network (PAN), Campus Area Network (CAN), Metropolitan area network (MAN), Wide area network (WAN), wireless local area network, cellular network, virtual local area network, or the like. The client device 104 may be a client workstation, a server, a computer, a portable electronic device, an entertainment system configured to communicate over a network, such as a set-top box, a digital receiver, a digital television, or other electronic devices. For example, portable electronic devices may include, but are not limited to, cellular phones, portable gaming systems, portable computing devices, or the like. The client device 104 may have access to the Internet via a firewall, a router, or other packet switching devices.

In the depicted embodiment, the computing environment 100 also includes a publisher 110 (e.g., server or content repository), and one or more web servers 116. The publisher 110 may be a creator or distributor of multimedia content. For example, if the multimedia content to be streamed is a broadcast of a television program, the publisher 110 may be a server of a television or cable network channel such as the ABC® channel, or the MTV® channel. Multimedia content from the publisher may be transferred over the Internet 106 to the content server 102, which may be configured to receive, process, and store multimedia content. In one embodiment, the content server 102 delivers the multimedia content to the client device 104, which is configured to play the content on a media player that is operating on the client device 104. The content server 102 delivers the multimedia content by streaming the multimedia content to the client device 104. In a further embodiment, the client device 104 is configured to receive different portions of the multimedia content from multiple locations simultaneously as described in more detail below.

Multimedia content from the content server 102 may be replicated to other web servers 116, or alternatively to proxy cache servers 118. Replicating may occur by deliberate forwarding from the content server 102, or by a web, cache, or proxy server outside of the content server 102 asking for content on behalf of the client device 104. For example, the client device 104 may request and receive content from any of the multiple web servers 116, or proxy cache servers 118. In a further embodiment, the multimedia content may be forwarded directly to the web servers 116 or proxy cache 118 servers through direct communication channels 120 without the need to traverse the Internet 106. In another embodiment, the web servers 116, proxy caches 118, and content server 102 may be organized in a hierarchy of a CDN to deliver the multimedia content to the client device 104. As described above, a CDN is a system of computers networked together across the Internet 106 that cooperates transparently to deliver content. In this embodiment, the content server 102 is the origin content server. The CDN may also include interconnected computer networks or nodes to deliver the multimedia content.

In one embodiment, the publisher 110 stores the multimedia content in an original content file to be distributed. The content file may include data corresponding to video and/or audio corresponding to a television broadcast, sporting event, movie, music, concert, or the like. The original content file may include uncompressed video and audio, or alternatively, uncompressed video or audio. Alternatively, the content file may include compressed content (e.g., video and/or audio) using standard or proprietary encoding schemes. The original content file from the publisher 110 may be digital in form and may include multimedia content having a high bit rate, such as, for example, 2 Mbps or greater.

The content server 102 may receive the content file from the publisher 110, and decompress the content file (if encoded) into raw audio and/or video. In one embodiment, the content server 102 segments the raw audio and/or video of the content file into multiple portions of the content (e.g., streamlets) as described below. The portions may have an equal duration, or alternatively, the portions may have equal file sizes, or vary one to another according to other requirements. Each portion of the content may then be encoded into multiple encoded representation of the same portion of content. The multiple encoded representations may be encoded according to different quality profiles and stored as separate files that are independently requestable and independently playable by the client device 104. Each of the files may be stored in any one or all of the content server 102, the web servers 116, and the proxy caches 118, and may be separately requested and delivered to the client device 104. In another embodiment, the content server 102 segments streams of the multimedia content that have already been encoded into portions of the multimedia content.

In the depicted embodiment, the computing environment 100 also includes a messaging server 130. The messaging server 130 provides real-time updates for multimedia content of a live event delivered over the Internet 106. When the multimedia content has been encoded and stored on the content server 102, the messaging server receives information that indicates when the encoded multimedia content is available for delivery to the client device 104, and sends an update to client devices that are interested in updates for the multimedia content to indicate that the encoded multimedia content is available for delivery. For example, the messaging server 130 may receive a subscription request from a media player operating on the client device 104 to subscribe to a message service operating on the messaging server 130 for a particular live event. When the messaging server 130 receives an update for the schedule of the live event, the messaging server 130 sends the update to each of the media players subscribed to the messaging service, including the media player operating on the client device 104. In one embodiment, the multimedia content of the live event is identified using a unique content identifier (UCID). The messaging server 130 uses the UCID to track the media players interested in receiving updates for the particular UCID. For example, when a user selects a particular live event, the media player may send a subscription request to the messaging server 130 that includes the UCID corresponding to the live event. In addition, when the messaging server 130 receives an update for the UCID, the messaging server 130 may perform a lookup operation using the UCID to determine which of the media players are subscribed to the messaging service for the UCID.

In one embodiment, the messaging server 130 monitors the content server 102 to determine when the encoded multimedia content is available for delivery. In another embodiment, an encoder (not illustrated in FIG. 1A) notifies the messaging server 130 when the encoder has finished encoding and storing the multimedia content on the content server 102. For example, the encoder can notify the messaging server when portions of the multimedia content have been sent to the content server 102.

In other embodiments, the computing environment 100 may include other devices, such as directory servers, Digital Rights Management (DRM) servers, statistic servers, devices of a network infrastructure operator (e.g., an ISP), or the like.

It should be noted that there are two main types of streaming video, video-on-demand (VOD), and live video. There are two types of live video: In some cases, the multimedia content of the live event is played out while the content is being encoded, and the anchor point is the time that the encoding of the event began. In other cases, the multimedia content of a live event may be pre-encoded, but scheduled to play out at a particular point in time. In either case, the playback of the content is required to occupy approximately the same amount of time as the original live event, in order to keep the playback of the multimedia content synchronized with the schedule. VOD playback differs from live playback (sometimes referred to as live playout) in that, with VOD content, there is no anchor point in real time. A piece of VOD content begins playing when a viewer requests the VOD content. For example, an original television broadcast may be shown at a particular point in time, and subsequently, the publisher makes the television broadcast available as VOD content. In addition, since the VOD content is not anchored to a particular schedule, the advertisements in the VOD content do not have to match a scheduled duration of original advertisements in the live broadcast.

In the case of VOD over the Internet, there is no concept of "lag behind live" when not being played back according to a schedule. That is because the event is pre-recorded and is available in its entirety before playback begins. In effect, for VOD content, there is no live point to which playback should be synchronized with a schedule for playback. For example, there is no live point to which the viewer should be restored after an advertisement break. Advertisement breaks for VOD content can be of any duration without affecting the viewer's experience of the regular program content. In the case of VOD, the timing for advertisement insertion may be very flexible, as compared to the timing for advertisement insertion in multimedia content of a live event.

Figure 1B:
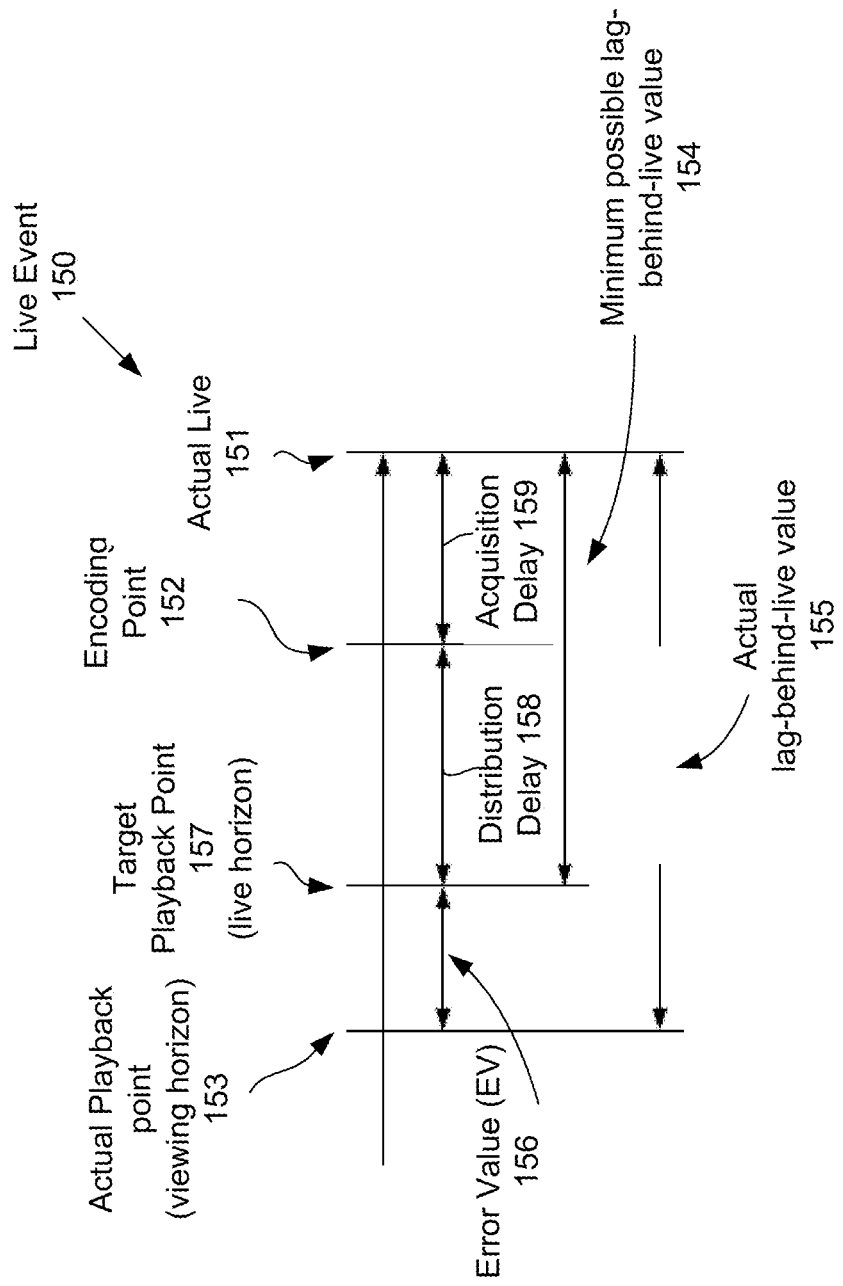
FIG. 1B is a graphical representation of different points in time of a live event according to one embodiment.

FIG. 1B is a graphical representation of different points in time of a live event according to one embodiment. For a particular live event 150 delivered over the Internet by a particular technology, there is a minimum possible lag behind live (e.g., minimum possible lag-behind-live value, X, 154). The term "lag behind live," as used herein, generally refers to the difference between when a particular piece of content is available for Internet distribution and when a particular viewer views the piece of content on the media player. The "lag behind live" can vary between viewers and can vary over time for a single viewer. For a particular live event, delivered by a particular technology, there is a minimum lag behind live (e.g., 154) due to the time to record, or otherwise capture the live event and to make the recorded content available for Internet distribution, for example. The concept of "lag behind live" applies to live events, as well as pre-recorded multimedia content that is scheduled to be played back at a particular point in time. The term multimedia content of a live event applies to any multimedia content that is scheduled to be played back at a particular point in time. The live event may be a television program, a concert, a movie, a song, or other type of broadcasts of multimedia content over the Internet, each of which is schedule to be played back at a particular point in time, such as according to a publisher's schedule (e.g., Appointment TV and "live" event broadcasts).

The minimum possible lag-behind-live value 154 may be zero to several minutes depending on the equipment of the system and the system's settings. The minimum possible lag-behind-live value 154 accounts for delays caused by acquisition and distribution of the multimedia content of the live event, designated as distribution delay 158 and acquisition delay 159. The minimum possible lag-behind-live value 154 may be fixed for a particular live event. Also, the distribution delay 158 and acquisition delay 159 may be zero. The actual lag-behind-live value 155 is the difference in time between a particular point in time in the live event 151 (e.g., actual live) and an actual playback point 153 of when a portion of the multimedia content corresponding to the particular point in time is played back on the media player 200. The actual playback point 153 is sometimes referred to as the viewing horizon, whereas the target playback point 157, which is when the multimedia content is available for playback on the media player, is sometimes referred to as the live horizon. In one embodiment, the minimum possible lag-behind-live value 154 is the difference in time between the particular point in time in the live event 151 (e.g., actual live) and when the portion of the multimedia content is available to the media player via Internet distribution. In another embodiment, the minimum possible lag-behind-live value 154 is the difference in time between the particular point in time in the live event 151 and when the portion of the multimedia content has been encoded, also referred to as the encoding point 152. In another embodiment, the minimum possible lag-behind-live value 154 is the difference in time between the particular point in time in the live event 151 and when the portion of the multimedia content is available for playback on the media player (e.g., live horizon) 157. In one embodiment, an error value 156 is measured as the difference between the actual lag-behind-live value 155 and the minimum possible lag-behind-live value 154. For example, a viewer watching a live event with a minimum lag-behind-live of one minute should ideally be watching action that began to be recorded and processed one minute before, assuming an error value 156 of zero. Alternatively, other technologies for live Internet video may have lower or greater minimum possible lag-behind-live values, but the same challenges apply in reducing the error value 156 to be as close to zero as possible. Focusing on the error value 156 rather than the actual lag-behind-live value 155 simplifies the discussion. It should be noted that that the error value 156 is non-negative, and can conceivably be zero, but since the actual lag-behind-live value 155 can, by definition, never be less than the minimum possible lag-behind-live value 154, the error value 156 can never be less than zero. It should also be noted that although the viewers may be able to pause or to rewind the video while watching a live event, in such cases, the error value 156 can be calculated, but may be considered meaningless, since the viewer is aware that they are no longer attempting to watch the live event as it happens.

In one embodiment, during a live Internet video event, when a particular advertisement break ends, ideally the viewer should start seeing the live program content with a very low error value 156 (the difference between the current lag behind live for a particular viewer and the minimum lag behind live). For many publishers of live Internet video, minimizing the actual lag-behind-live value 155 is an important component of providing a good viewer experience. However, since the minimum possible lag-behind-live value 154 for a particular technology is generally fixed for a particular event, only the error component (e.g., error value 156) of the lag behind live may be subject to optimization.

In one embodiment, the multimedia content is segmented into portions of the multimedia content, referred to herein as streamlets. The term "streamlet," as used herein, refers to a single encoded representation of a portion of the video. Each streamlet may be an individual file that includes a portion of the multimedia, and may be encapsulated as an independent media object, allowing the streamlet to be cached individually and to be independently playable by a media player. In one embodiment, a streamlet is a static file that can be served by a non-specialized server, instead of a specialized media server. In one embodiment, the content in a streamlet may have a predetermined length of playback time. The predetermined length of time may be in the range of between about approximately 0.1 and 5.0 seconds, for example. The content in the streamlet may have a unique time index in relation to the beginning of the content contained in the stream. Alternatively, the streamlets may be divided according to a file size, instead of a time index. The term "stream," as used herein, may refer to a collection of streamlets of the video encoded by the same video quality profile, for example, portions of the video that have been encoded at the same video bit rate. The streamlets may be stored as separate files on any one or more of the web servers 116, or the proxy caches 116, or other devices within a CDN. The separate files (e.g., streamlets) may be requested from the web server using HTTP. Using a standard protocol, such as HTTP, eliminates the need for network administrators to configure firewalls to recognize and pass through network traffic for a new, specialized protocol, such as Real Time Streaming Protocol (RTSP). Additionally, since the media player initiates the request, a web server, for example, is only required to retrieve and serve the requested streamlet, not the entire stream. The media player may also retrieve streamlets from more than one web servers. These web servers may be without specialized server-side intelligence to retrieve the requested portions. In another embodiment, the streamlets are stored as separate files on a cache server of a network infrastructure operator (e.g., an ISP), or other components of a CDN. Although some of the present embodiments describe the use of streamlets, the embodiments described herein are not limited to use in computing systems that use streamlets, but may also be implemented in other systems that use other techniques for delivering live multimedia content over the Internet. For example, in another embodiment, the multimedia content is stored in a single file that is divided into portions that can be cached in the CDN using HTTP range requests.

There are two general types of multimedia streaming, namely push-based streaming and pull-based streaming. There are additional problems that may arise based on the type of multimedia streaming technology used to deliver the multimedia content. Push technology describes a method of Internet-based communication where the request for a given transaction is initiated by the server, such as a publisher's content server). Pull technology, in contrast, describes a method of Internet-based communication where the request for transmission of information is initiated by the client device, and then is responded to by the server. One type of request in pull technology is a HTTP request (e.g., HTTP GET request). In contrast, in push-based technology, typically a specialized server uses specialized protocol, such as RTSP to push the data to the client device. In pull-based technology, a CDN may be used to deliver the multimedia to multiple client devices. The CDN is a system of computers networked together across the Internet that cooperates transparently to deliver content, and may include, for example, an origin content server, web servers, cache servers, etc. Typically, the CDN is configured in a hierarchy so that a client device requests the data from an edge cache, for example, and if the edge cache does not contain the requested data, the request is sent to a parent cache, and so on up to the origin content server. Some examples of CDNs would be CDNs developed by Akamai Technologies, Level3 Communications, or Limelight Networks. Alternatively, other CDNs may be used.

In a pull-based configuration, when a media player requests a file of the multimedia content that is not available for delivery over the Internet, problems can arise. For example, when the media player requests a file that is not yet available on a CDN, a miss in a cache in the CDN may result. When there is a miss in the cache, the origin content server returns an error code, such as an HTTP 404 error code, indicating a miss in the cache. This error code is also cached in the affected portions of the hierarchy. As such, even when the data becomes available shortly after the error code is cached, other client devices that request the same data will get the cached error code, instead of the requested data, despite the data being available for delivery. Until its expiration (e.g., after thirty seconds), the error code prevents the data from being requested by any media players within the same structure of the hierarchy. The media players effectively have to wait to acquire additional metadata in order to know that the file is now available in the CDN before re-requesting the file. Since the data cannot be requested until the error code expires, this type of error code can be detrimental to streaming multimedia content of a live event, especially when trying to minimize the lag behind live.

There are at least two main causes to this problem. One is time synchronization. For example, if you join a live event that is already in progress, the media player determines where in the stream the media player should start to play. In some cases, this would be at the beginning of the content (e.g., VOD), but in other cases, where the system is expected to act like regular broadcast television over the air, this should be at or close to the live playout of the multimedia content. In this case, the media player may rely on the local time of the computer, as represented by the computer's clock, in determining live playout. If the user's clock is not accurate, the media player may attempt to request multimedia content that is not yet available for delivery. For example, the media player may request a portion of the multimedia content that has not been encoded and stored yet on the content server of a CDN. The other cause of media players requesting multimedia content being available for delivery is when the clock in a video or sound card is running faster than the CPU clock. For example, the clock in the video card may be imperfect and may cause the video to play a little too fast. When close enough to the live horizon, the media player may request portions of the multimedia content before they are available for delivery over the Internet.

In one contemplated embodiment, the media player may request portions of the multimedia content by requesting individual streamlet files, referred to herein as QSS files. The media player requests the QSS files according to a metadata descriptor file, referred to as a QMX file. The QMX file indicates the current duration of the multimedia content represented by the available QSS files. The QMX file may operate as a table of contents for the multimedia content, indicating which QSS files are available for delivery, and from where the QSS files can be retrieved. The media player fetches a QMX file, for example, in response to selecting the multimedia content, and the media player reads the QMX file to determine when to start playback of the multimedia content using the current duration, and where to request the QSS files. For example, if the multimedia content has a duration of one hour, and the multimedia content is segmented into QSS files having two-second durations, there are 1800 QSS files for each encoded representation of the multimedia content. If the multimedia content is encoded according to ten different quality profiles, there are 18,000 QSS files for the multimedia content. The quality profiles may indicate how the stream is to be encoded, for example, the quality profiles may specify parameters, such as width and height of the image (i.e., image size), video bit rate (i.e., rate at which the video is encoded), audio bit rate, audio sample rate (i.e., rate at which the audio is sampled when captured), number of audio tracks (e.g., mono, stereo, or the like), frame rate (e.g., frame per second), staging size, or the like. The QMX file includes a QMX timestamp, such as a UTC (Coordinated Universal Time) indicator, which indicates when the encoding process started (e.g., start time of the multimedia content), and a current duration that indicates how much of the multimedia content is available for delivery. For example, the QMX timestamp may indicate that the encoding process started at 6:00 pm (MDT), and 4,500 QSS files of the multimedia content are available for delivery. The media player can determine that the content duration (live playout) is approximately fifteen minutes, and decide to start requesting QSS files corresponding to the playback of the program at fifteen minutes into the program or slightly before that point. In one embodiment, the media player can determine the point in the multimedia content at which the media player should start playing the content by fetching the corresponding streamlets at that offset into the multimedia content. Each time the encoder stores another set of QSS files on the content server (e.g., set of ten QSS files representing the next two seconds of multimedia content at the ten different quality profiles), the QMX file is updated that can be fetched by the media player to indicate that two more seconds are available for delivery over the Internet. The media player can periodically check for updated QMX files. The time to propagate the updated QMX file to an edge cache of the CDN, and the time for the media player to acquire and process the updated QMX file can add to lag behind live. For example, in a best case scenario (referred to herein as the best-case QMX standard playback), approximately 7-8 seconds may be added to the lag behind live. Since the QMX file indicates what files are stored on the content server, the media player cannot request portions of the multimedia content that are not yet available for delivery, avoiding the problems described above with respect to the conventional approaches.

Figure 2A:
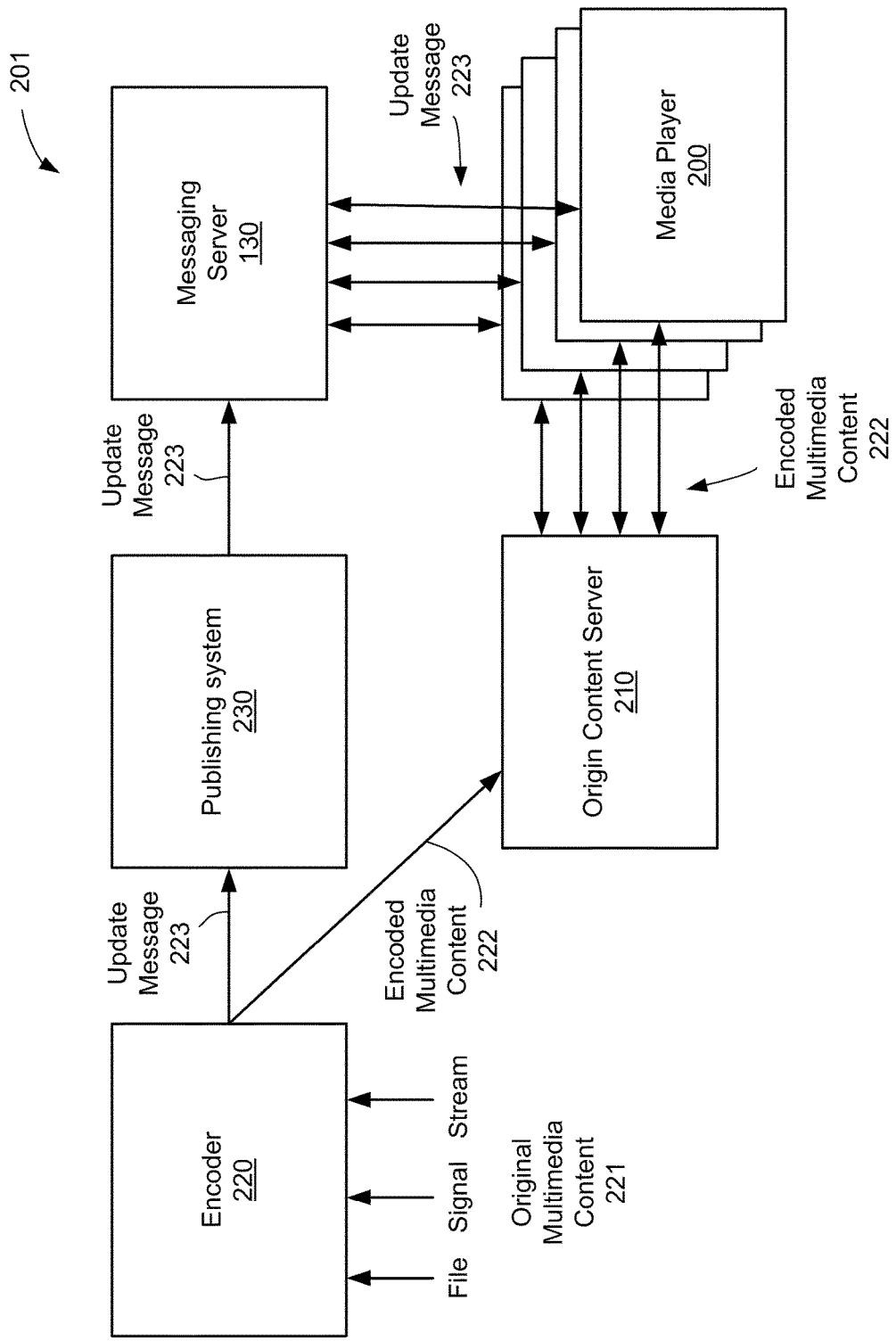
FIG. 2A is a schematic block diagram illustrating one embodiment of a computing environment in which the messaging server of FIG. 1A may be employed.

FIG. 2A is a schematic block diagram illustrating one embodiment of a computing environment in which the messaging server of FIG. 1A may be employed. The computing environment 201 includes the messaging server 130 of FIG. 1A, an encoder 220, a publishing system 230, an origin content server 210, and multiple media players 200, each operating on a client device, such as the client device 104. The encoder 220 receives the original multimedia content 221 of the live event, for example, by receiving an original content file, as described above, a signal from a direct feed of the live event broadcast, a stream of the live television event broadcast, or the like. In one embodiment, the encoder 220 receives the original multimedia content 221 as one or more content files from a publisher (e.g., publisher's server or publisher's content repository). Alternatively, the encoder 220 receives the original multimedia content 221 as it is captured. For example, the encoder 220 may receive a direct feed of the live television broadcast, such as a captured broadcast, in the form of a stream or a signal. The original multimedia content 221 may be captured by a capture card, configured for television and/or video capture, such as, for example, the DRC-2600 capture card, available from Digital Rapids of Ontario, Canada. Alternatively, any capture card capable of capturing audio and video may be utilized with the present invention. The capture card may be located on the same server as the encoder, or alternatively, on a separate server. The original multimedia content 221 may be a captured broadcast, such as broadcast that is being simultaneously broadcasted over the air, cable, and/or satellite, or a pre-recorded broadcast that is scheduled to be played at a specific point in time according to a schedule of the live event. The encoder 220 may utilize encoding schemes such as DivX® codec, Windows Media Video 9® series codec, Sorenson Video® 3 video codec, TrueMotion VP7 codec from On2 Technologies®, MPEG-4 video codecs, H.263 video codec, RealVideo 10 codec, OGG Vorbis, MP3, or the like. Alternatively, a custom encoding scheme may be employed.

The encoder 220 encodes the original multimedia content 221 and sends the encoded multimedia content 222 to the origin content server 210, which delivers the encoded multimedia content 222 to the media players 200. The encoder 220 also sends an update message 223 to the publishing system 230 to indicate that the encoded multimedia content 222 has been sent to the origin content server 210, and is available for delivery to the media players 200. In one embodiment, the encoder 220 segments the multimedia content into portions of the multimedia event, each portion encoded according to a different quality profile, such as the ten QSS files having two-second durations encoded according to the ten different quality profiles, described above in one embodiment. When the encoder has finished encoding the portion (e.g., ten different quality QSS files of the same two-second portion), the update message 223 indicates that the portions are available for delivery. The update message 223 may also specify which quality profiles are available for the particular portion of the multimedia content. The publishing system 230 sends the update message 223 to the messaging server 130. Upon receiving the update message 223, the messaging server 130 sends the update message 223 to each of the media players 200 that is subscribed to receive updates from the messaging server 130 for the multimedia content. The update message 223 provides control information for signaling the media player when to request the multimedia content to avoid requesting multimedia content that is not available for delivery. The update message 223 may include the entire QMX file or just the portion of the QMX file that indicates how much of the multimedia content is available for delivery. The messaging server 130 can push control signals to multiple media players, even though the media players request the multimedia content from the origin content server 210, for example, using HTTP. This modified pull-based configuration may have an advantage over conventional push-based configurations because this configuration can be scaled using the scaling capabilities of CDNs to deliver HTTP traffic, but also be able to push control signals, which are small in comparison to the requested multimedia content, to multiple media players. This configuration can help reduce caching delays of a CDN and can provide a mechanism for providing advertisement insertion on live events in real time or near real time. In another embodiment, multiple messaging servers 130 are used to scale the configuration even further. For example, a data center that stores the encoded multimedia content may have a cluster of messaging servers 130 to service media players that request the encoded multimedia content from the data center. Alternatively, other configurations may be used as would be appreciated by one of ordinary skill in the art having the benefit of this disclosure.

In one embodiment, the encoder 220 is implemented in the same device as the publishing system 230. In another embodiment, the messaging service is implemented in the same device as the publishing system 230, instead of on separate devices as illustrated in FIG. 2A.

Figure 2B:
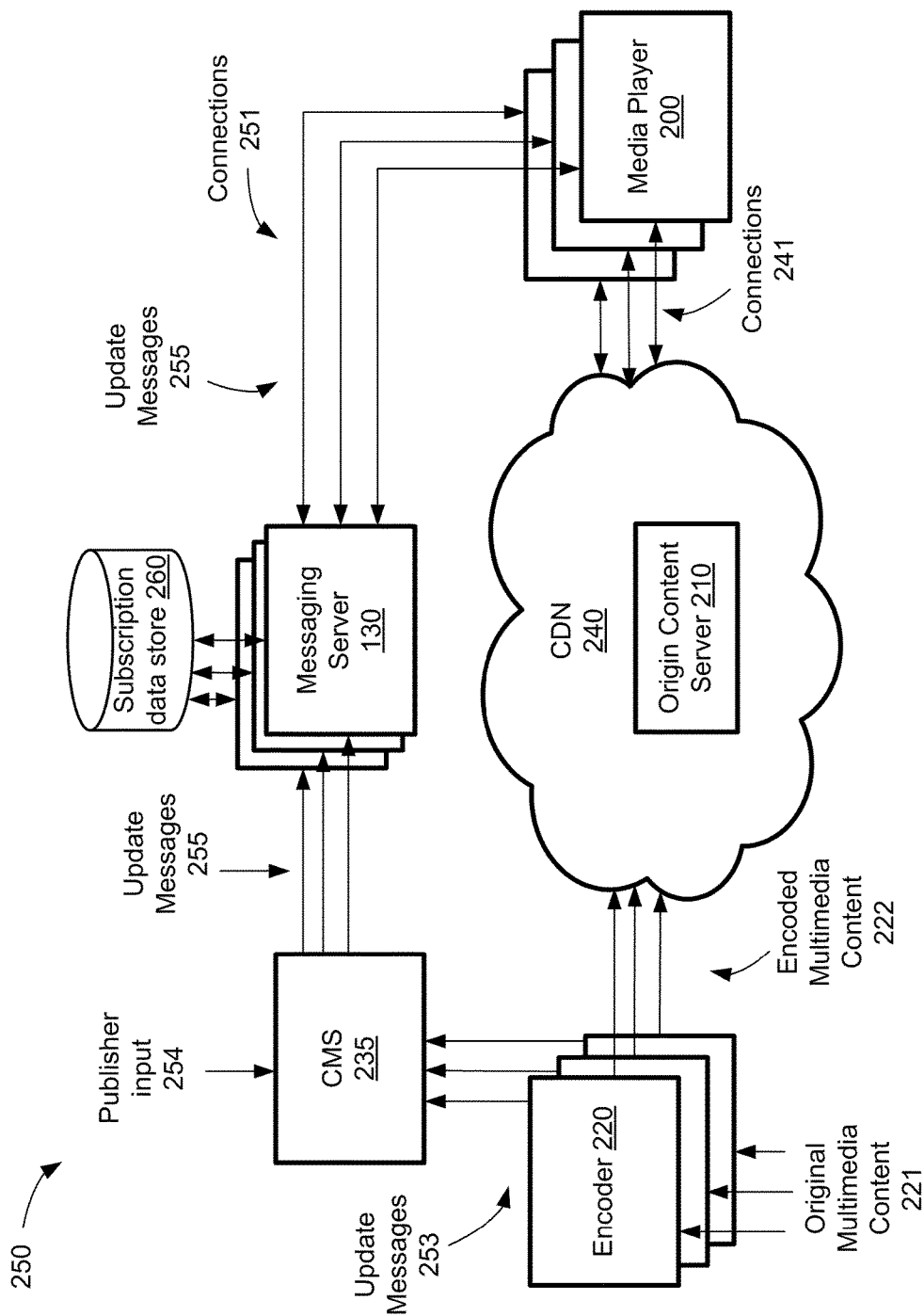
FIG. 2B is a schematic block diagram illustrating another embodiment of a computing environment in which the messaging server of FIG. 1A may be employed.

FIG. 2B is a schematic block diagram illustrating one embodiment of a computing environment in which the messaging server 130 of FIG. 1A may be employed. The computing environment 250 includes a set of messaging servers 130 of FIG. 1A, a set of encoders 220, a content management system (CMS) 235 as the publishing system, a CDN 240, a subscription data store 260, and multiple media players 200, each operating on a client device, such as the client device 104. The CDN 240 includes the origin content server 210. In this embodiment, the set of encoders 220 receives the original multimedia content 221 of a live event.

In one embodiment, the set of encoders 220 segments the content files of the original multimedia content 221 into multiple streamlets according to multiple video quality profiles. The corresponding streamlets of different qualities may have the same duration and same time index, for example. The set of encoders 220 provides the encoded multimedia content 221 to a CDN 240. The CDN 240 stores and delivers the encoded multimedia content 221 that has been encoded by the encoder 220. In particular, the set of media players 200 requests and receives the multimedia content 222 of the live event from the CDN 240 over the connections 241. It should be noted that, although one line has been illustrated for each media player 200, each line may represent multiple network connections to the CDN 240. In one embodiment, each media player 200 may establish multiple Transport Control Protocol (TCP) connections to the CDN 240. In another embodiment, the multimedia content is stored in multiple CDNs, for example, stored in the origin servers associated with each of the multiple CDN. The CDN 240 may be used for the purpose of improving performance, scalability, and cost efficiency to the end users (e.g., viewers) by reducing bandwidth costs and increasing global availability of content. CDNs may be implemented in various manners, and the details regarding their operation would be appreciated by one of ordinary skill in the art. As such, additional details regarding their operation have not been included. In other embodiments, other delivery techniques may be used to deliver the multimedia content to the media players from the origin servers, such as peer-to-peer networks, or the like.

The media players 200 can request and receive the encoded multimedia content 222 from the CDN 240 over connections 241. The media players 200 may individually request different qualities of the same multimedia content 222, for example, each media player 200 may request the same portion (e.g., same time index) of the multimedia content 222, but at different quality levels. For example, one media player may request a streamlet having HD quality video, since the computing device of the requesting media player has sufficient computational power and sufficient network bandwidth, while another media player may request a streamlet having a lower quality, since its computing device may not have sufficient network bandwidth, for example. In one embodiment, the media player 200 shifts between qualities at the portion boundaries by requesting portions from different copies (e.g., different quality streams) of the multimedia content, as described in U.S. Patent Application Publication No. 2005/0262257, filed Apr. 28, 2005. Alternatively, the media player 200 can request the portions using other techniques that would be appreciated by those of ordinary skill in the art having the benefit of this disclosure.

The computing environment 250 includes the CMS 235. The CMS 235 is a publishing system that manages the encoded multimedia content 220, for example, using a database, and allows a publisher to generate timelines (referred to herein as a virtual timeline (QVT)) to schedule the playback of the live multimedia content. The publishing system, in this embodiment, the CMS 235, receives information from the encoder 220. In one embodiment, the CMS 235 receives information from the set of encoders 220 in the form of update messages 253. In one embodiment, the update messages 253 includes availability information that indicates that the set of encoders 220 has sent portions of the encoded multimedia content 222 to the origin content server 210. In another embodiment, the update messages 253 include information that indicates what quality levels are available for a particular portion of the multimedia content 222. Alternatively, other information, such as metadata, may be sent in the update messages 253 to the CMS 235, such metadata, including, for example, air date of the content, title, actresses, actors, a start index, an end index, proprietary publisher data, encryption level, content duration, episode or program name, publisher, available tools for the end-user navigational environment, such as available menus, thumbnails, sidebars, advertising, fast-forward, rewind, pause, and play, or the like, or bit-rate values, including frame size, audio channel information, codecs, sample rate, and frame parser information. It should be noted that although the origin content server 210 has been illustrated as being within the CDN 240, the origin content server 210 may reside outside of the CDN 240 and still be associated with the CDN 240. For example, one entity may own and operate the content server that stores the streamlets, but the CDN 240, whose devices may be owned and operated by one or more separate entities, delivers the streamlets.

In one embodiment, the CMS 235 also receives publisher input 254. In one embodiment, the CMS 235 generates metadata for the encoded multimedia content 222 of the live event, such as the QVT. The timeline may indicate when the encoded multimedia content 221 is available for delivery over the Internet to be requested by the media players 200, and may indicate when the media players 200 should play the multimedia content. For example, the timeline may specify a starting time of the multimedia content 222, and a current duration of the multimedia content 222 (e.g., amount of available portions of the multimedia content available for delivery) to allow playback of the multimedia event of the live event according to the schedule. In the example above, the set of encoders 220 is currently updating the CMS 235 with information about streams to indicate that certain portions of the stream have been sent to the origin content server 210 associated with the CDN 240. The CMS 235 may generate the update message 255 containing either an updated timeline or an update for a previously-generated timeline to be sent to the messaging server 130. The messaging server 130, as described above with respect to FIG. 2A pushes the update messages 255 to the subscribed media players 200.

In one embodiment, the CMS 235 may generate a virtual timeline (QVT). The QVT may define a playlist for the viewer. The QVT may represent a day, a week, a month, etc. worth of programming, or alternatively, may represent just the requested program. For example, the QVT may indicate the schedule of the live event, such as designated when to start playing certain portions of the multimedia content using the media player 200, and when to stop playing the multimedia content for advertisement breaks, which may be filled by one or more advertisements selected by the media player 200. The QVT may also be intermingled with live and non-live content. The CMS 235 may use the publisher input 254 to generate virtual timelines to schedule the playback of the live multimedia content.

In one embodiment, the QVT includes one or more advertisement markers. Each advertisement marker indicates the start time of the advertisement break, as well as the scheduled duration of the advertisement break. In another embodiment, the QVT includes a start advertisement marker that indicates the start time of the advertisement break, and an end advertisement marker that indicates the end time of the advertisement break. In some embodiments, the QVT is updated during the advertisement break to indicate when the advertisement break should end. The QVT allows the publisher to define a broadcast schedule in a manner similar to a television station. The media player 200 can anchor, or otherwise associate the start of the QVT with an actual point in time, such that upon playback, the media player 200 can start playback of the multimedia content at a position that reflects "live" in the timeline. For example, the QVT could be anchored to 10:00 am, MDT on Jan. 1, 2009. If at 10:15 am, a viewer begins the timeline, the media player could determine that fifteen minutes have already elapsed since the anchor point of the timeline, so playback would begin fifteen minutes into the timeline for this particular viewer. This arrangement simulates normal television viewing, where a person turns on the TV and views whatever content is now playing, and two viewers in different locations viewing the same channel see the same show, even if one of them has been watching for several hours and the other has just turned on the TV. Alternatively, playback could commence at the beginning of the program (start of the timeline) and a viewer would effectively be fifteen minutes behind live. In one embodiment, the media player 200 is configured to anchor, or otherwise associate the QVT with a time relative to the local time zone of the media player 200. For example, the QVT may be associated with the start of the day in the local time zone of the media player 200. Accordingly, a publisher could advertise a certain event starting at 6:00 pm, and regardless of the local time zone of the media player, the event would appear to start at 6:00 pm. In one embodiment, the QVT is marked to be periodically updated, indicating to the media player 200 to periodically check for an updated QVT, for example, every 5 seconds. The refresh interval is largely determined by the CDN parameters, such as how much load can the CDN handle, CDN time-to-live (TTL) values, and propagation delays. In another embodiment, the media player 200 can refresh the QVT periodically between 30-120 seconds. In another embodiment, instead of refreshing the QVT, the messaging server 130 pushes an updated QVT to the media players 200 to periodically update the QVT, or pushes an update that is used by the media player 200 to update the original QVT. Using the QVT, the publisher can dynamically alter the scheduled playout of the multimedia content and advertisements without interrupting playback. The updated QVT may also be used to designate upcoming advertisement breaks, or to dynamically schedule advertisement breaks.

In another embodiment, the encoder 220 generates QMX files to be sent in the update messages. As described above, the QMX file is a metadata descriptor file that indicates the current duration of the media represented by the available QSS files (e.g., streamlets). The QMX file may operate as a table of contents for the multimedia content, indicating which QSS files are available for delivery, and from where the QSS files can be retrieved. The media players 200 may use the QMX in connection with the QVT to determine what QSS files to request, and when to play the requested QSS files to allow playback of the multimedia content according to the schedule of the live event. In another embodiment, the update message contains only the portions of the QMX that changed, instead of containing the full QMX in each update message.

In one embodiment, the CMS 235 receives the QMX files or the updated portions of the QMX file, and in response, generates update messages containing the updated information for the subscribed media players. In another embodiment, the messaging server 130 generates the update messages based on the update information from the CMS 235 and/or from the encoders 220.

Unlike the approach described above in which the media player pulls the QMX files from the CDN 240, in one embodiment, the messaging server 130 pushes the QMX files (i.e., in the update messages 255) to the media players 200 on connections 251. In this embodiment, each time the set of encoders 220 stores another set of QSS files on the content server (e.g., set of ten QSS files representing the next two seconds of multimedia content at the ten different quality profiles) and updates the CMS 235, the CMS 235 can generate an updated QMX file to be sent as the update message 255 to the messaging server 130, which pushes the update messages 255 to the subscribed media players 200. The pushed QMX file of the update messages 255 indicates that two more seconds are available for delivery over the Internet. In this embodiment, the media players 200 do not periodically check for updated QMX files, but receives the update QMX files automatically from the messaging server 130. In this embodiment, the lag behind live will be less than the previous approach since there is no delay for the updated QMX file to propagate to the edge cache of the CDN 240, and there is no delay for the media players 200 to acquire the updated QMX file. For example, FIG. 8A illustrates the best-case scenario (referred to herein as the best-case QMX standard playback), in which approximately 7-8 seconds may be added to the lag behind live from QMX propagation 801 (e.g., at best 2.5 seconds), and QMX acquisition 802 (e.g., at best 4.5 seconds). Although the this approach does not allow the media players 200 to request portions of the multimedia content before they are available, the embodiments of the messaging server 130 decrease the lag behind live, as illustrated in FIG. 8B. FIG. 8B illustrates playback using the proposed messaging service in which there is no delay caused by QMX propagation 851, and QMX acquisition 852, since the messaging server 130 pushes the QMX files to the subscribed media players. In effect, the messaging server 130 can reduce the lag behind live by at least 7-8 seconds, as compared to the previous approach. In other embodiments, the messaging server 130 can reduce the lag behind live even more than eight seconds. In addition, like the previous approach, the embodiments of the messaging server 130 do not have the problems described above with respect to the conventional systems, since the media players 200 cannot request portions of the multimedia content before they are available. Alternatively, the media player 200 can periodically pull the updated QMX files from the messaging server 130, instead of from the CDN 240.

In one embodiment, the media player 200 requests (e.g., pulls) an initial QVT, and the updated QVT may be pushed to the media player 200 by way of the update messages 255 from the messaging server 130. The initial QVT may be received through the CDN 240, or alternatively, through other means outside of the CDN 240, such as through the messaging server 130. In another embodiment, the messaging server 130 pushes the initial QVT and the updated QVT to the media players 200. In another embodiment, the messaging server 130 pushes an initial QVT and updated QMX files to the media player 200 to indicate when the multimedia content is available for delivery, and to allow the media player to play the multimedia content according to the schedule of the live event.

Figure 3:
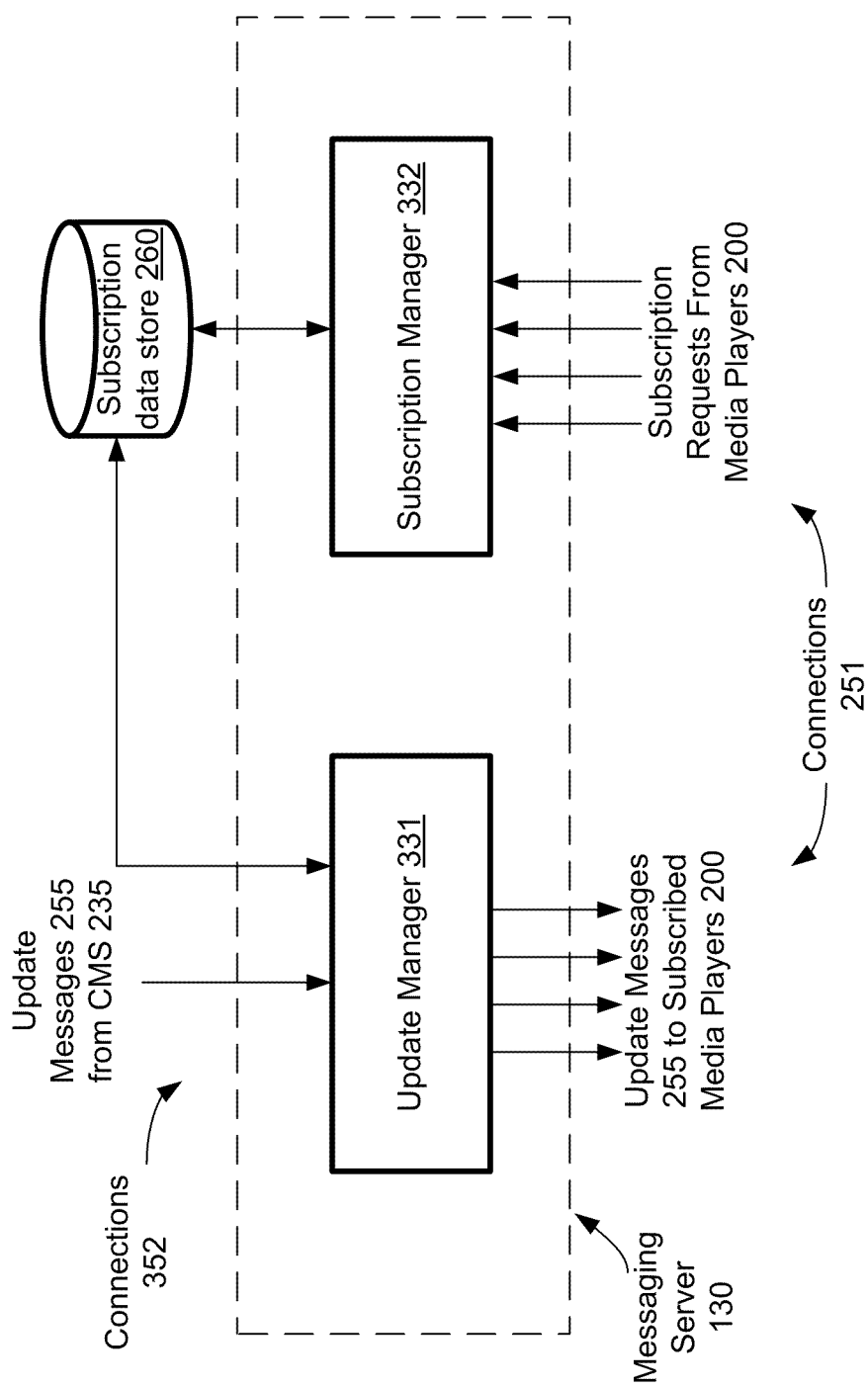
FIG. 3 is a schematic block diagram illustrating one embodiment of the messaging server of FIG. 2B.

FIG. 3 is a schematic block diagram illustrating one embodiment of the messaging server 130 of FIG. 2B. As depicted, the messaging server 130 includes an update manager 331 and a subscription manager 332. The subscription manager 332 receives subscription requests from any number of the media players 200 over the connection 251. Upon receiving the subscription request, the subscription manager 332 subscribes the respective media player to a messaging service for the multimedia media content. In one embodiment, each subscription request comprises a UCID. The subscription manager 332 uses the UCID to track the media players interested in receiving updates for the particular UCID. For example, when a user selects a particular live event, the user's media player may send a subscription request to the messaging server 130 that includes the UCID corresponding to the live event. The subscription manager 332 stores an entry in the subscription data store 260 to indicate that the user's media player is subscribed to receive updates for the UCID. The subscription request 332 may also indicate the location of the user's media player, such as a network address, or the like. In another embodiment, the subscription data store 260 is a relational database that stores a column table for each UCID, and the rows correspond to the subscribed media players for the particular UCID. Alternatively, other types of data stores may be used as would be appreciated by one of ordinary skill in the art having the benefit of this disclosure.

The update manager 331 receives through a network connection 352 the update messages 255 from the CMS 235, and pushes the update messages 255 to the subscribed media players 200 through the connections 251. For example, when the messaging server 130 receives an update for a particular UCID, the update manager 331 performs a lookup operation in the subscription data store 260 using the UCID to determine which of the media players are subscribed to the messaging service for the UCID. Once the update manager 331 has determined which of the media players are subscribed to receive updates for the UCID, the update manager pushes the update messages 255 to the subscribed media players 200 through the connections 251. Although the update manager 331 and the subscription manager 332 have been illustrated as separate blocks, in other embodiments, the update manager 331 and subscription manager 332 may be integrated into one functional block.

As described above, in one embodiment, the messaging server 130 can send to the media players 200 real-time updates having real-time control information to update advertisement information of an advertisement break in the multimedia content. The term "real-time" as used herein is used to indicate that the messages are pushed as soon as the messaging server has the updated information, such that the update duration information is propagated to the media players more quickly, as contrasted with the media player polling. The polling may be on the order of several seconds, whereas the real-time updates may be provided to the media player less than approximately one second. There are at least two models for insertion of advertisements into live events, such as live Internet video. The first model, which has been described above, inserts advertising into the video stream of the live event at some point before the video stream reaches the encoder (i.e., the advertisements are inserted before being encoded for delivery over the Internet. Since the advertisements are inserted before encoding, all viewers see the same advertisements at the same point in time in the live event, for example. In this model, the media player is not involved in selecting the advertisements for the advertisement breaks. In the second model, each individual media player 200 selects and inserts one or more advertisements into the multimedia content for live events (referred to herein as live multimedia content) to fill one or more advertisement breaks in the live event. In this model, each viewer potential sees a different advertisement at the same location in the multimedia content.

Selecting advertisements by the media player, instead of inserting them into the video stream before the media server, is much more flexible. At the very least, it is possible to precisely control the number of advertisements impressions served. For example, an advertiser can buy 50,000 advertisements impressions and the broadcaster can serve exactly that many advertisement impressions. There is also the potential for the advertising to be more targeted based on the geographic location and/or demographics of individual viewers instead of the average demographic of the program, as done in television broadcasts. The embodiments described below with respect to FIG. 4 are directed at the second model in which the media player 200 selects and inserts one or more advertisements into an advertisement break.

Figure 4:
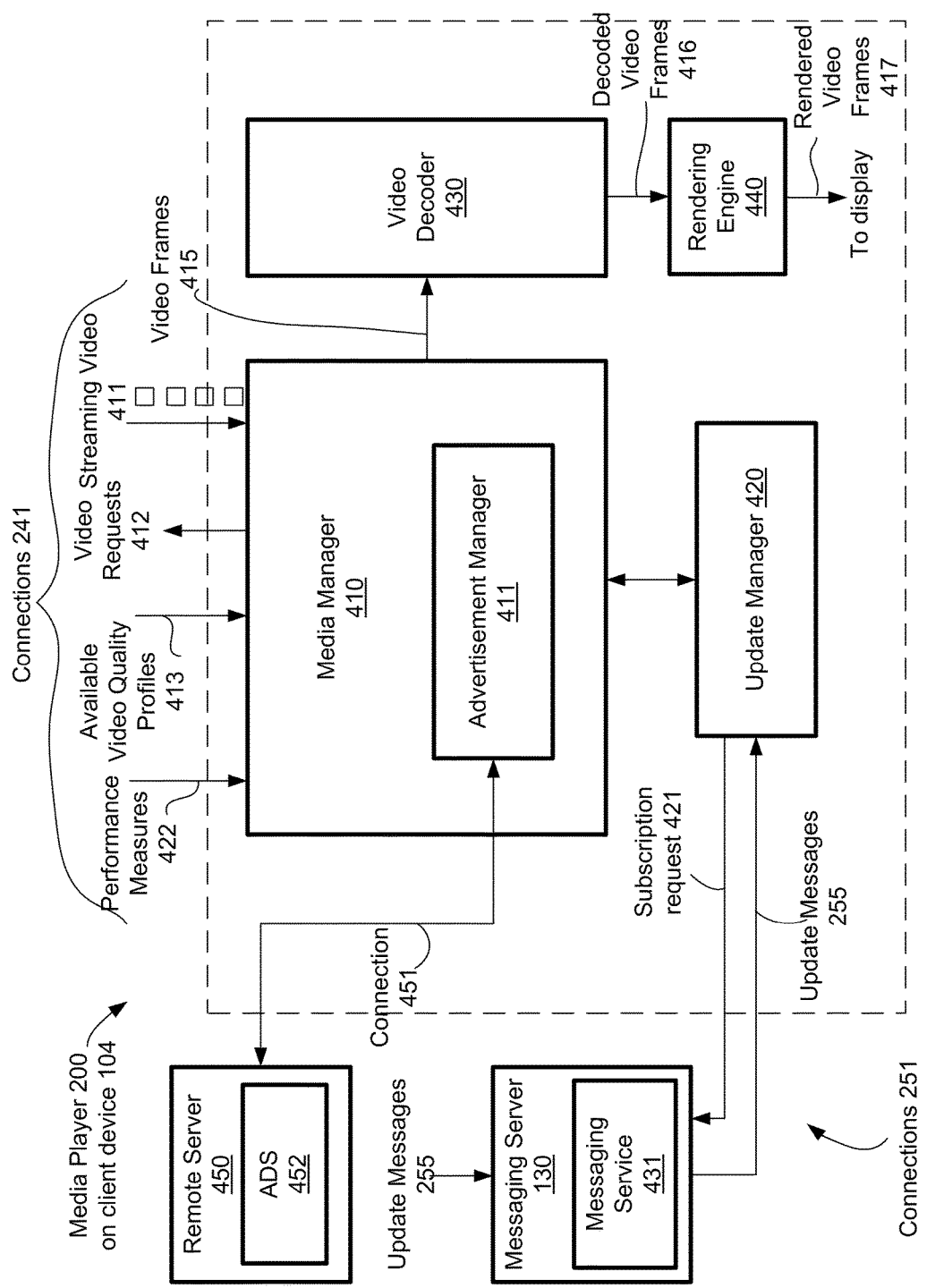
FIG. 4 is a schematic block diagram illustrating one embodiment of a media player coupled to the messaging server of FIG. 2B.

FIG. 4 is a schematic block diagram illustrating one embodiment of a media player 200 coupled to the messaging server 130 of FIG. 2B. The media player 200 includes a media manager 410, an update manager 420, an advertisement manager 411, a video decoder 430, and a rendering engine 440.

The media manager 410 is coupled to the video decoder 430. The media manager 410 receives streaming video 411 and the available video quality profiles 413 associated with the streaming video 411 from the CDN 240 (e.g., one of the web servers 116 or proxy caches 118) over the connections 241. The media manager 410 may receive the available video quality profiles 413 in a metadata file from the content server 102 over the connections 241, or alternatively, from the publisher. In another embodiment, the media player 200 receives the available video quality profiles 413, and other types of metadata from the messaging server 130. In one embodiment, the update manager 420 receives the update messages 255 from the messaging service 431 on the messaging server 130. The update manager 420 can supply the metadata file of the available video quality profiles to the media manager 410, as well as other types of metadata. The metadata file may describe an entire content file, for example, using a virtual timeline that represents when the multimedia content and the intermittent advertisement breaks are to be sequentially played by the media player 200. The metadata file may include information, such as, for example, a start index, a duration, an end index, whether the content is live, proprietary publisher data, encryption level, content duration, bit rate values, including frame size, audio channel information, codecs used to encode the portions of the video, sample rates, and frame rate. The metadata file may include various parameters about the available video quality profiles 413 for the streaming video 411. The parameters for each of the available video quality profiles 413 may include the width and height of the image (i.e., image size), video bit rate (i.e., rate at which the video is encoded), audio bit rate, audio sample rate (i.e., rate at which the audio is sampled when captured), number of audio tracks (e.g., mono, stereo, or the like), frame rate (e.g., frame per second), staging size, or the like. The available video quality profiles 413 may also include a table indicating the file size of one or more portions (e.g., streamlets as described below) of the streaming video 411, such as the first portions of the requested video.

The media manager 410 may receive the streaming video 411 over the connections 241 as a sequence of files (e.g., streamlets) for each of the time indexes, and then arrange the files according to the time indexes. In this embodiment, the media manager 410 sends video requests 412 to request portions of the streaming video 411. The media manager 410 may request and receive the files sequentially in time according to the time indexes. Alternatively, the media manager 410 may receive the files in an order that is not sequential in time according to the time indexes. Alternatively, the media manager 410 receives one or more files concurrently, for example, over multiple TCP connections. Although the media content may be segmented into sequential streamlets, and encoded into individual streamlets according to different video quality profiles, the streamlets may be independently requested and received, and independently playable by the media player.

The media manager 410 decides what streamlets to request based on any number of given constraints and/or preferences set by, for example, a viewer, the publisher, the web page designer, or constraints or preferences generated within the media player 200, for example, the media player 200 can decide what streamlets to request based on the performance measures 422, staging size (e.g., viewing window), the maximum and/or minimum acceptable video quality profile, the available video quality profiles, or the like. In one embodiment, the performance measures 422 are network performance measures. In another embodiment, the performance measures 422 are computational load measures, such as the current computational load on the CPU or the amount of available processing capability of the CPU. The media manager 410 may also decide based on factors, including, for example, the optimal video quality profile, or the amount of video already available in the media manager 410. In one embodiment, the media manager 410 determines a performance factor of the network as described in U.S. Patent Application Publication No. 2005/0262257, filed Apr. 28, 2005. Alternatively, the media manager 410 can track network performance and generate network performance measures using other techniques that would be appreciated by those of ordinary skill in the art.

In one embodiment, the performance measure 422 is a current bandwidth estimate. In another embodiment, the performance measure 422 is indicative of the available bandwidth of one or more TCP connections (e.g., connections 241 that receive the streaming video 411). In another embodiment, the performance measure 422 is indicative of a current read ahead margin. The current read ahead margin is a current amount of contiguous, sequentially arranged, un-played portions of the video for playback on the media player. In another embodiment, the performance measure 422 is indicative of a minimum safety margin. The minimum safety margin is the smallest size the current read ahead margin should be to avoid interruption or stalling in the playback of the video on the media player. In another embodiment, the performance measure 422 is indicative of latency of the requested portions. The latency is a time measure between when a request is issued and a time that response data of the requested portion begins to arrive at the client device 104. In another embodiment, the performance measure 422 is indicative of time intervals between successive receive times for each response to the requested portions. In another embodiment, the performance measure 422 is indicative of delays or losses in one or more of the TCP connections. In another embodiment, the performance measure 422 is indicative of the number of bytes for a small interval of time, regardless to which streamlet the data belongs. Alternatively, other performance measures may be used, for example, performance measures that relate to the performance of the network, or performance measures that relate to the performance of the client device. The performance measures 422 may be monitored and used by the media manager 410 in predictively selecting the predicted video quality profile for one or more subsequent streamlets. Alternatively, the media manager 410 may monitor and use the performance measure 422 in deciding what video to request, decode, and render. In response, the media player 200 may periodically select the optimal video quality profile for requesting subsequent portions of the video. When played by the media player 200, the streaming video 411 may include streamlets that were encoded according to different video quality profiles.

The media manager 410 may decide what portions of video to request in order to play the requested video based on certain criteria, and requests the streamlets accordingly. The media manager 410 then stages the downloaded streamlets into a sequence of streamlets in the order in which the streamlets should be decoded and rendered. In the depicted embodiment, the media manager 410 extracts the video frames 415 from the staged video portion and passes the video frames 415 to the video decoder 430.

The video decoder 430 decodes the video frames 415 and outputs the decoded video frames 416 to the rendering engine 440. In one embodiment, the video decoder 430 implements the TrueMotion VP7 codec, available from On2 Technologies®. Alternatively, other video decoders may be used. The rendering engine 440 renders the decoded video frames 416, and outputs the rendered video frames 417 to a display. The display may be a viewing window within a GUI, generated by the media player 200. Alternatively, the display may be a screen of the client device, such as a computer monitor, a television screen, or the like.

In one embodiment, a user selects a link on a web page to request which video of a live event the user wishes to view. In response to selecting the video to stream, the update manager 420 sends a subscription request 421 to the messaging server 431 operating on the messaging server 130 for the selected live video over one of the connections 251. Once the media player is subscribed to the messaging service 431 for the selected video, the messaging service 431 sends the update messages 255 to the update manager 420 over one or more of the connections 251. One of the update messages 255 may include a metadata descriptor file that identifies a network address, such as a Uniform Resource Locator (URL), from where the video (e.g., encoded multimedia content 222) can be retrieved by the media manager 410. The update messages 255 may include the available video quality profiles 413, the QVT and/or the QMX files described above. The media manager 410 may store the metadata file in memory associated with the media manager 410. The media manager 410 may use the available video quality profiles 413 in predicting the optimal video quality profile for requesting subsequent portions of the video.

In another embodiment, the media player 200 includes an advertisement manager 411 for managing advertisements for streaming multimedia content (e.g., Internet video) of a live event. As depicted, the advertisement manager 411 may be implemented within the media manager 410. Alternatively, the advertisement manager 411 may be implemented outside of the media manager 410. Similarly, the update manager 420 may be implemented within the media manager 410, or outside the media manager 410, as depicted in FIG. 4. Alternatively, the advertisement manager 411 and the update manager 420 may be implemented together as one functional block.

During playback of the live multimedia content, the update manager 420 may receive update messages 255 that include updates containing advertisement information, such as advertisement markers that indicates start times and scheduled durations for one or more advertisement breaks. The update manager 420 sends the advertisement markers to the advertisement manager 411. For example, the update message 255 may contain an updated QVT. The updated QVT may be used to designate upcoming advertisement breaks, or to dynamically schedule advertisement breaks. Alternatively, the update message 255 may contain an update that can be used to modify a QVT that has already been delivered to the media player 200.

The advertisement manager 411 may select one or more advertisements for playback to fill the scheduled durations of the advertisement breaks. In one embodiment, when advertising is inserted by the advertisement manager 411, one technique for advertisement selection is for the advertisement manager 411 to send a request for an advertisement decision over a connection 451 to an Advertisement Decision Service (ADS) 452, operating on a remote server 450. In response to the request, the advertisement manager 411 receives a response that identifies one or more advertisements to play. The response may include a network address that indicates from where the one or more advertisements can be retrieved by the media manager 410. The ADS 452 may be an external service, running on the remote server 450 accessible over the Internet. The ADS 452 selects the advertisement to play from an inventory of available advertisements (e.g., advertisement impressions). The inventory may represent the advertisements that the publisher of the multimedia content has sold to advertising customers.

Rules in the ADS 452 may influence the selection of an advertisement from the inventory. The rules may take into account information supplied in the request 221 by the media player 200, such as the local time of the media player 200, keywords, the geographic location of the media player 200 (e.g., determined by the host's IP address), demographics of the viewer (user of the media player), and the like. These rules and others would be appreciated by one of ordinary skill in the art, and as such, additional description of these rules has not been included. In one embodiment, when the advertisement manager 411 requests the advertisement decision, the ADS 452 returns the identity of the advertisement to be presented to the requesting media player. After the advertisement is selected in this fashion, the media manager 410 fetches and plays the advertisement. Each individual media player may potentially receive a different advertisement response for the same advertisement opportunity (e.g., the scheduled advertisement break). Since the media players 200 individually select the advertisements to fill the advertisement breaks, the media players 200 may play back different advertisements than one another, as well as different advertisements than the original broadcast. The advertisement insertion by the media player 200 is transparent to the viewer, and may allow directed or targeted advertisement. The directed advertisements may be dynamically selected by the media player 200 based upon various factors, including, but not limited to, the geographical location of the media player, the website the event is being viewed on, the user profile, browsing history of the viewer, buying history of the viewer, time, date, demographic information of the viewer, interest or preferences of the viewer, or the like.

In one embodiment, the advertisements breaks are scheduled advertisement breaks at predetermined points in time relative to the beginning of the live event. The one or more advertisements may be multimedia advertisements, such as pre-recorded video advertisements, pre-recorded audio advertisements, audio content, or even a static image to be displayed during at least a portion of the advertisement break. Alternatively, other types of advertisements may be used to fill the advertisement breaks. In another embodiment, the publisher dynamically schedules the advertisement breaks at designated points in time of the live event. For example, during a broadcast of a sporting event, the publisher may insert an advertisement that was not previously scheduled, for example, during a time-out in the sporting event. In this embodiment, the CMS 235, for example, can insert an advertisement marker in an updated QVT and send the updated QVT to the messaging server 130 to be pushed to the media players 200. The updated QVT may include a start advertisement marker that indicates a starting time of the advertisement break. In one embodiment, the updated QVT includes a start advertisement marker that indicates a start time of the advertisement break and a scheduled duration of the advertisement break. In another embodiment, the updated QVT includes a start advertisement marker, but does not include a scheduled duration. In this embodiment, another updated QVT is pushed to the media players during the advertisement break that includes an end advertisement marker that indicates an end time of the advertisement break.

In one embodiment, the remote server 450 stores the available advertisements, and the media manager 410 requests the selected advertisements from the remote server 450 before the advertisement break. In another embodiment, the media player 200 stores the available advertisements 453. Alternatively, the available advertisements 453 are stored and retrieved over the Internet from servers that are distinct from the media player and the remote server 450. In one embodiment, the ADS 452 supports an interface that receives the duration of the advertisement break from the media player 200 and/or any targeted-advertisement information, and returns the identities of advertisement(s) that should be requested by the media player 200 to fill the advertisement break. In other cases, the advertisement manager 411 determines the number and durations of the one or more advertisements selected to fill the scheduled advertisement break, and makes individual requests for the one or more advertisements of the appropriate durations from the ADS 452, or elsewhere. Alternatively, other techniques for advertisement selection could be implemented, for example, the ADS 452 may be implemented within the media player 200, or within the content server 102. Alternatively, the selection of advertisements may be done using other techniques than using the ADS 452. Additional details of how advertisement selection can be done would be appreciated by one of ordinary skill in the art, and accordingly, further description regarding such has not been provided.

In one approach of live Internet video, a particular advertisement break can occupy a fixed portion of the live event in one embodiment. Typically, the source content of a live Internet video event is a broadcast television event, and the advertisement breaks available to the live Internet video event are simply the advertisement breaks of the source broadcast television event. The location and duration of these advertisement breaks are fixed and do not vary according to the performance of one or more media players. In some cases, the originally-scheduled advertisements are simply played as part of the live Internet video event. In this case, there is no need for Internet advertisement insertion. However, there is frequently a need to replace the original scheduled broadcast advertisements with Internet advertisements because of broadcast rights, improved ability for the publisher to charge for advertisement delivery, or the like. It should be noted that if the live event is being viewed on the Internet only, there may not be any original advertisements to replace. However, there is still the concept of an advertisement break that the advertisements must occupy.

When advertisements are inserted into an advertisement break in a live Internet video event, the inserted advertisements (effective advertisement break), as played by the media player 200, should occupy approximately the same amount of time as the scheduled advertisement break that they fill. If the advertisement break on the player ends too soon, the content following the advertisement break is not yet available to be viewed. If the advertisement break goes on too long, then when the regular program resumes, either the error value 156 is greater at the end of the advertisement break than at the beginning, or else some of the program content immediately following the advertisement break must be skipped in order to minimize the error value 156. In another embodiment, the remaining time of the advertisement break may be filled with filler content. In one embodiment, the filler content is a static image to be displayed for the remaining time in the advertisement break. For example, the static image may be of a product or a brand name or logo, such as the publisher's logo, the logo for the live event, or other advertisement information. In another embodiment, the filler content is a short advertisement, which can easily be truncated, and can loop until the end of the advertisement break. In another embodiment, the filler content may be a black screen or a status screen indicating the time until the regular program will resume on the media player 200. Alternatively, the filler content may include other content to fill the remaining time of the advertisement break. After the advertisement break, the media player returns to play the live multimedia content.

Figure 5:
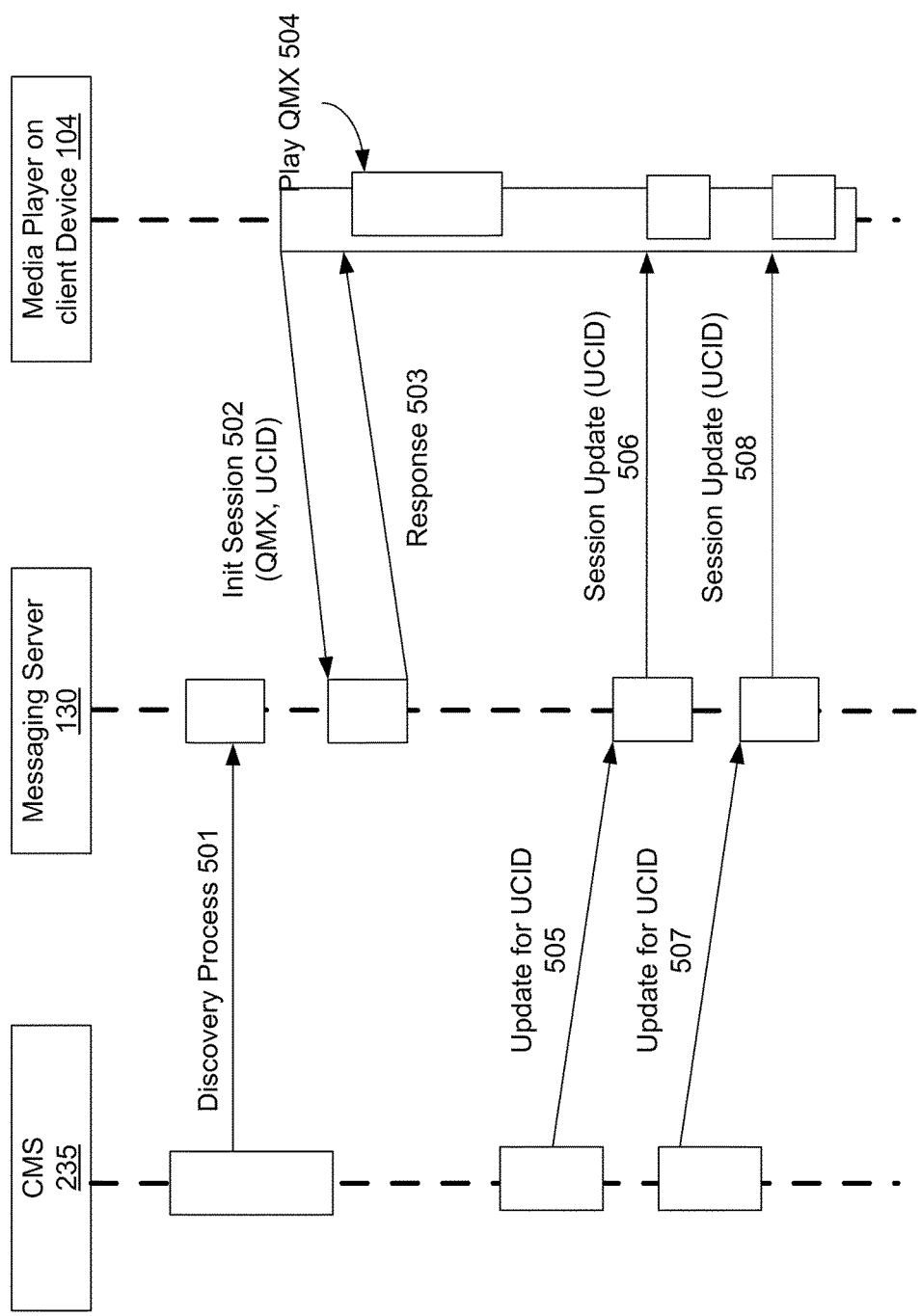
FIG. 5 is a flow diagram of one embodiment of a method of a messaging service for a live multimedia event.

FIG. 5 is a flow diagram of one embodiment of a method 500 of a messaging service for a live multimedia event. The method 500 is performed by processing logic on the respective devices, the CMS 235, the messaging server 130, and the client device 104. In this embodiment, the CMS 235 initiates a discovery process 501 to discover and initialize the messaging server 130. The discovery process may be used by the CMS 235 to find which of multiple messaging services to use for providing updates for the multimedia content. The multiple messaging services may be managed by a single messaging server or by multiple messaging servers. For example, in the discovery process, the CMS 235 may inform the appropriate messaging service that new multimedia content is being created and indicates which portions of the multimedia content is available for delivery. The CMS 235 may identify the new multimedia content using a UCID. The messaging server 130 can receive subscription requests from the media players 200. The media player 200 on the client device 104 selects a live event to view, and initiates a session with the messaging server 130. As described herein, the media player 200 may send a subscription request, including the UCID for the requested content, to the messaging server 130 to subscribe to the messaging service for the UCID. The media player, as part of initiating the session, may request a QMX file. Alternatively, the messaging server 130 can automatically push the QMX file to the media player 200. In response, the messaging server 130 subscribes the media player to the messaging service for the UCID, and sends a response 503 to the media player, including the requested QMX. The media player plays 605 the QMX. During playback of the requested multimedia content of the live event, the CMS 235 sends an update 505 for the UCID. In response, the messaging server 130 sends the session update for the UCID (e.g., update messages for the UCID) to the subscribed media players, including the media player on the client device 104. In one embodiment, the messaging server 130 performs a lookup operation to determine which media players are subscribed to the messaging service for the UCID. In one embodiment, the update includes an updated QMX file, and the media player 104 plays the updated QMX file to update the QVT. In another embodiment, the update includes an updated timeline (e.g., QVT) including a start advertisement marker to indicate a start time of the advertisement break. During playback of the requested multimedia content or during playback of the one or more advertisements, the CMS 235 may send an additional update 507 for the UCID. In response, the messaging server 130 sends the session update for the UCID to the subscribed media players. In one embodiment, the additional update includes an updated QMX file, and the media player 104, plays the updated QMX file. In another embodiment, the additional update includes an updated timeline including an end advertisement marker to indicate an end time of the advertisement break.

FIGS. 6A-6D are flow diagrams of various embodiments of methods. The methods are performed by processing logic that may include hardware (circuitry, dedicated logic, or the like), software (such as is run on a general purpose computer system or a dedicated machine), firmware (e.g., embedded software), or any combination thereof. In one embodiment, the methods are performed by the messaging server 130 of FIGS. 1A and 2A-5. In another embodiment, the methods may be performed by other computing devices that manage the messaging service.

Figures 6A, 6B:
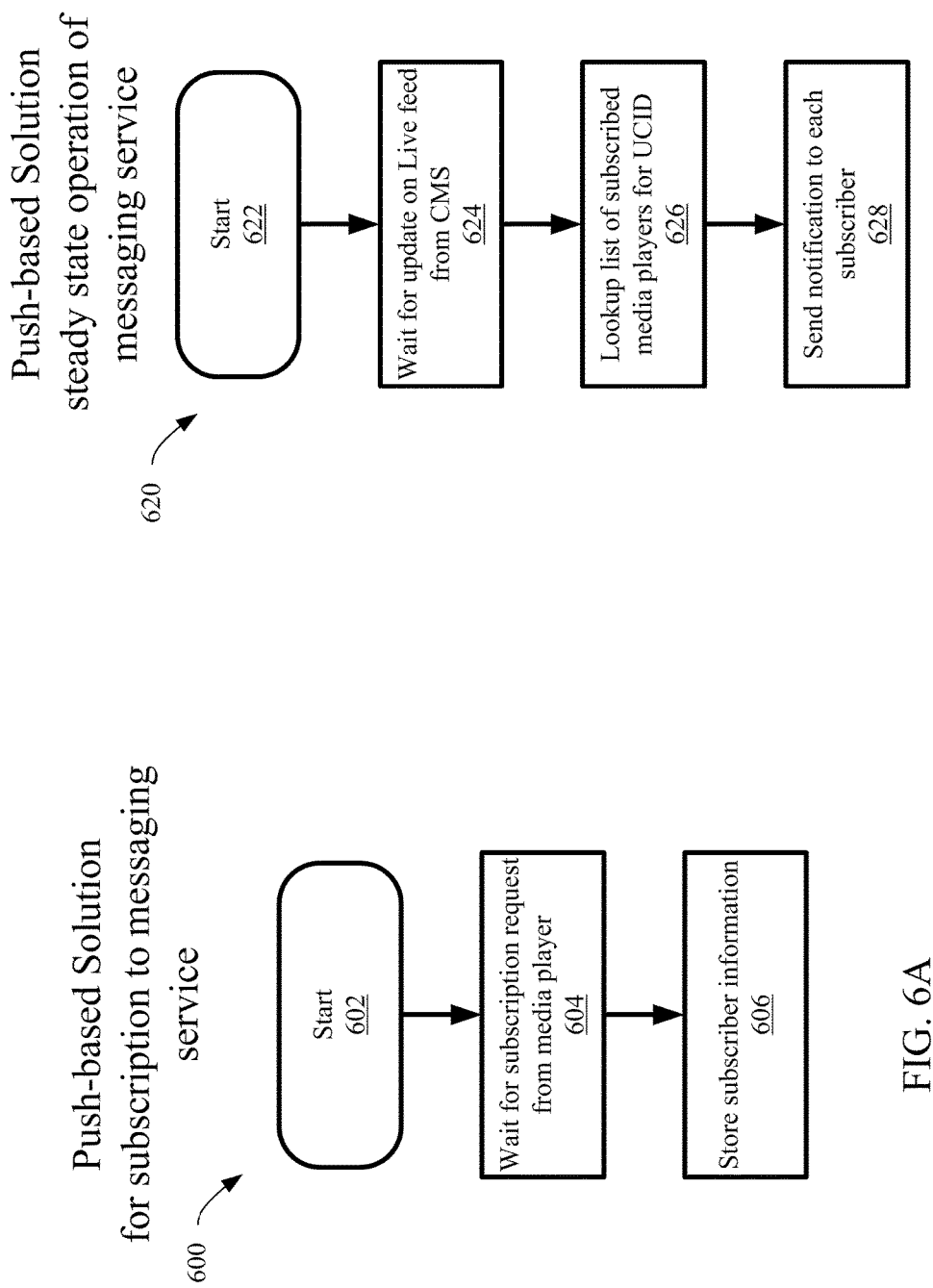
FIG. 6A is a flow diagram of one embodiment of a method of a push-based solution for subscription to a messaging service.
FIG. 6B is a flow diagram of one embodiment of a method of the push-based solution for steady state operation of the messaging service.

FIGS. 6A and 6B are flow diagrams of embodiments of method 600 and 620 of a push-based solution for subscription to a messaging service and for steady state operation of the messaging service.

In FIG. 6A, processing logic starts (block 602) by waiting for subscription requests from media players (block 604). Once a subscription request is received, the processing logic stores the subscriber information, such as, for example, the UCID requested, the network address of the media player, or the like. In one embodiment, the processing logic stores the subscriber information in a relational database, which is used to track which media players are subscribed to the particular multimedia content, for example, using the UCID.

In FIG. 6B, processing logic starts (block 622) by waiting for an update from the CMS, for example, on a live feed from the CMS (block 624). Once the update is received, the processing logic performs a lookup operation to obtain a list of subscribed media players for the UCID (block 626). The processing logic sends notification of the update to each of the subscribed media players on the list (block 628).

Figures 6C, 6D:
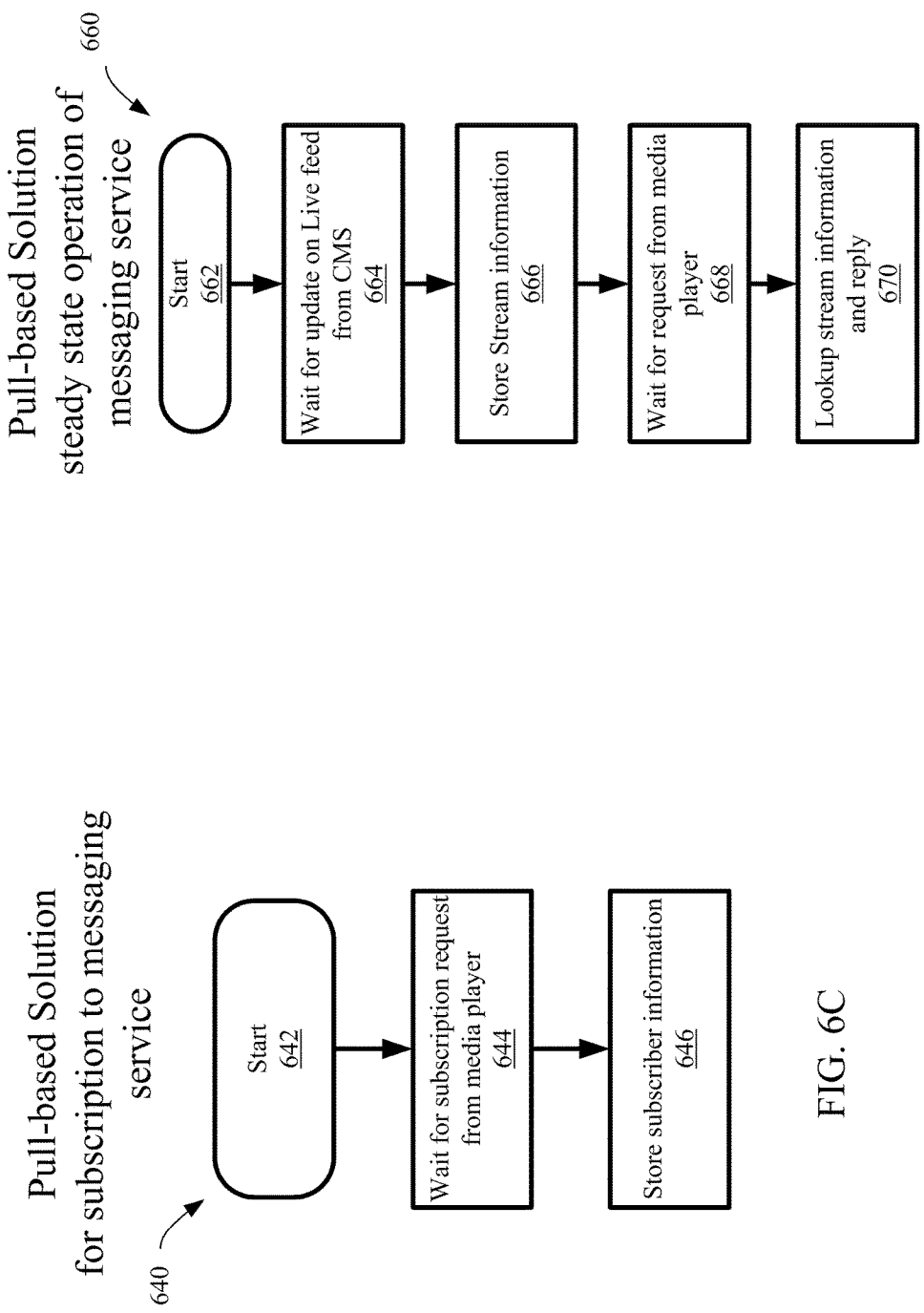
FIG. 6C is a flow diagram of one embodiment of a method of a pull-based solution for subscription to a messaging service.
FIG. 6D is a flow diagram of one embodiment of a method of the pull-based solution for steady state operation of the messaging service.

FIGS. 6C-6D are flow diagrams of embodiments of methods of a pull-based solution for subscription to a messaging service and for steady state operation of the messaging service. The method 640 in the pull-based solution in FIG. 6C may be similar to the method 600 in the push-based solution in FIG. 6A. The processing logic starts (block 642) by waiting for subscription requests from media players (block 644). Once a subscription request is received, the processing logic stores the subscriber information (block 646). The method 660 in the pull-based solution in FIG. 6D is dissimilar to the method 620 in the push-based solution in FIG. 6B.

In FIG. 6D, processing logic starts (block 662) by waiting for an update from the CMS, for example, on a live feed from the CMS (block 664). Unlike in method 620, once the update is received, the processing logic stores the stream information (block 666), which includes the update, and waits for a request from the media player for the stored stream information (block 668). In embodiment, the stream information is an updated QMX file. Instead of requesting the updated QMX file through the CDN, which may add propagation and acquisition delays as described herein, the media player can retrieve the updated QMX file from the messaging server. Once the processing logic receives the request from the media player in block 668, the processing logic performs a lookup operation to obtain the stored stream information, and replies to the request by sending the stored stream information to the media player (block 670).

Figure 7:
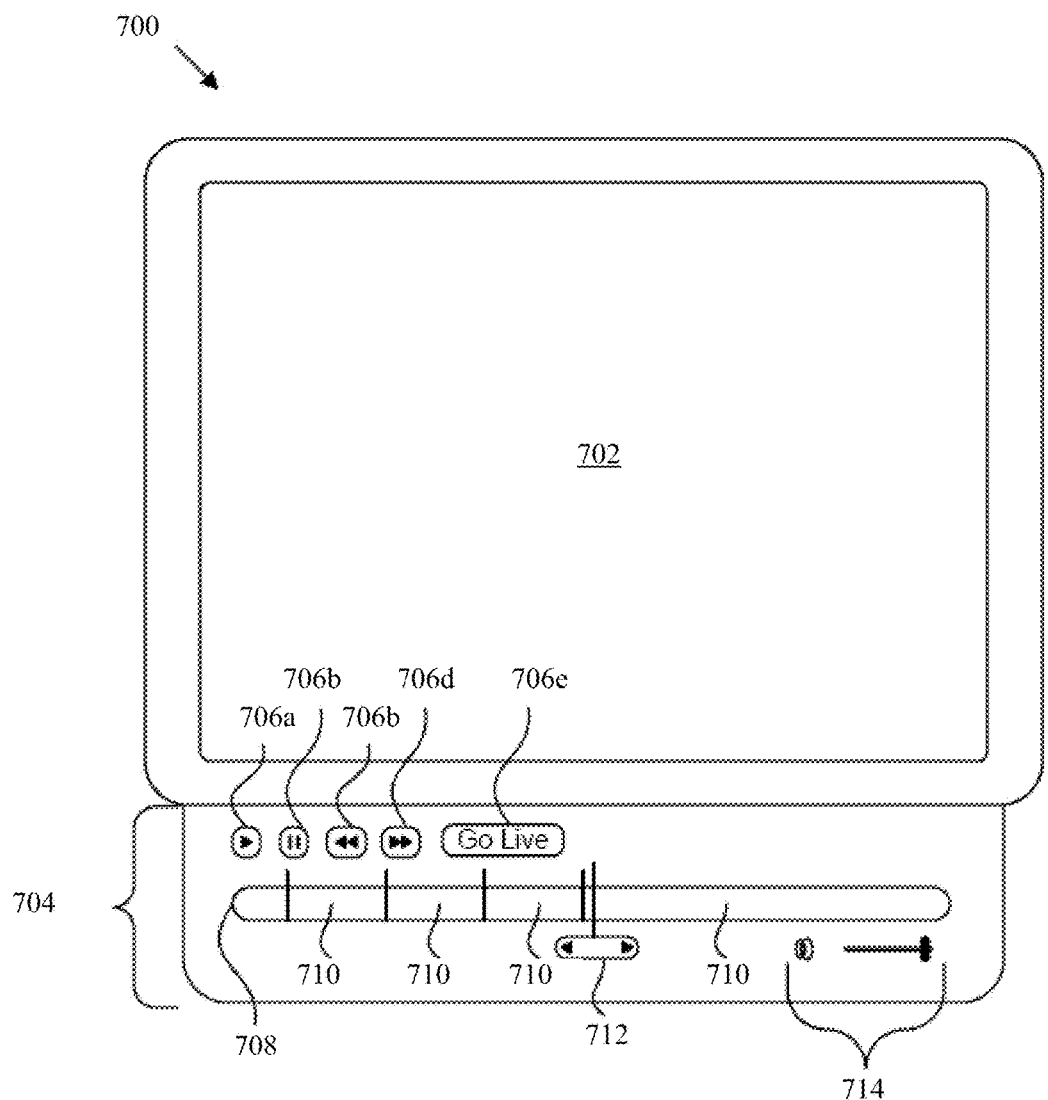
FIG. 7 illustrates a graphical user interface (GUI) of a media player in accordance with one embodiment.

FIG. 7 illustrates a GUI 700 of the media player 200 in accordance with one embodiment. The depicted GUI 700 of the media player 200 includes a viewing area 702 located above a control area 704. The viewing area 702 is configured to display the decoded and rendered multimedia content and advertisements, and may be resized according to a personal preference, or in order to accommodate various forms of audio/video. The control area 704 includes buttons 706 for controlling playback of the multimedia content. The buttons may include, but are not limited to, play 706*a*, pause 706*b*, rewind 706*c*, and fast forward 706*d*.

In the depicted embodiment, the GUI 700 further includes a timeline 708 that is configured to represent the available content. The timeline 708 is similar to a programming guide for a TV station. The portions 710, as depicted, may correspond with different television shows, or portions within the same television show. The status bar 712 indicates the current position relative to the timeline 708 of the content. In one embodiment, the status bar 712 may be "dragged" to the right in order to fast forward through the content and likewise to the left in order to rewind. The GUI 700 of the media player 200 may also include volume controls 714. The programs playing at selected times may also be listed on the timeline 708. The GUI 700 may include other buttons that correspond to additional functionality of the media player 200, such as adjusting the playback window to full-screen, mini-mode, a pop-out player window, additional playlist or content navigation aids.

In one embodiment, the media player 200 generates the GUI 700. The media player 200 may be software that is downloaded to the client device 104 prior to the user viewing the requested video. The media player 200 may be an add-on or plug-in to a web browser, or may be a stand-alone application by itself. In one embodiment, the client device 104 requests a video to stream, and the content server 102 provides the client device 104 with the media player 200 that generates the GUI 700 in which video may be displayed in the viewing area 702. In another embodiment, the client device 104 requests to download the player and installs the media player 200 on the client device 104 before requesting the video to stream. Alternatively, other configurations are possible, such as hosting the media player 200 from another device on the network, but displaying the GUI 700 on the client device 104, or the like.

FIG. 7 illustrates by way of example only, and one skilled in the art would appreciate that the GUI 700 of the media player 200 may be implemented with many different styles and orientations according to the available functionality of the media player 200.

It should be noted that various devices (e.g., client device, servers, publisher, etc.) as described herein are physical machines (e.g., computing devices), within which a set of instructions, for causing the machine to perform any one or more of the methodologies discussed herein, may be executed, such as a computer or a collection of computers that execute instructions. As would be appreciated by one of ordinary skill in the art having the benefit of this disclosure, the various devices may include one or more memory devices to store the instructions, and one or more computing devices to execute the instructions. The memory devices may be, for example, read-only memory (ROM), EPROMs, EEPROMs, flash memory, dynamic random access memory (DRAM) such as synchronous DRAM (SDRAM), flash memory, static random access memory (SRAM), a data storage device, or the like). The computing devices may be, for example, one or more general-purpose computing devices such as a microprocessor, central processing unit, a complex instruction set computing (CISC) microprocessor, reduced instruction set computing (RISC) microprocessor, very long instruction word (VLIW) microprocessor, processor implementing other instruction sets, processors implementing a combination of instruction sets, one or more special-purpose computing devices such as an application specific integrated circuit (ASIC), a field programmable gate array (FPGA), a digital signal processor (DSP), network processor, or the like. The various devices may include other components, as would be appreciated by one of ordinary skill in the art having the benefit of this disclosure.

The various machines may be networked in a Local Area Network (LAN), an intranet, an extranet, or the Internet. The devices may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, the term "machine" shall also be taken to include any collection of machines (e.g., computing devices) that individually or jointly execute a set (or multiple sets) of instructions to perform any one or more of the methodologies discussed herein.

The memory devices may be a machine-readable storage medium on which is stored one or more sets of instructions (e.g., software) embodying any one or more of the methodologies or functions described herein. The software may also reside, completely or at least partially, within the memory device and/or within the computing device during execution thereof by the computing device. The software may further be transmitted or received over a network, and stored in the memory device and/or the computing device to be executed by the computing device. The term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by a machine and that cause the machine to perform any one or more of the methodologies of the present invention. The term "machine-readable storage medium" shall accordingly be taken to include, but not be limited to, solid-state memories, and optical and magnetic media, non-volatile memory (NVM), and the like.

The algorithms and displays presented herein are not inherently related to any particular machine or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A messaging server computing device comprising:
a hardware interface configured to provide a set of one or more network connections coupled to the Internet;
a first tangible storage device configured as a subscription data store;
at least one processor device configured to interact with the subscription data store and the set of one or more network connections to:
receive through the set of network connections a subscription request from each of a plurality of media players, each respective media player of the plurality of media players operating on a client device coupled to the Internet; and
subscribe each respective media player of the plurality of media players to a messaging service for multimedia content of a live event to be encoded according to a timeline that is associated with an anchor point in time and delivered over the Internet substantially in real time as the live event is occurring by a content server using a unique content identifier by storing an entry in the subscription data store that indicates the respective media player is subscribed to receive updates for the unique content identifier; and
wherein the at least one processor device is further configured to:

receive an update for the unique content identifier from an encoding system that encodes the multimedia content through one of the set of network connections, wherein the update indicates a current duration of the multimedia content of the live event encoded into streamlets by the encoding system and stored on the content server; and in response to the update for the unique content identifier received from the encoding system:

perform a lookup operation in the subscription data store using the unique content identifier to determine which of the plurality of media players are subscribed to the messaging service for the multimedia content of the live event; and send an update message to each of the plurality of media players subscribed to the messaging service for the multimedia content of the live event over the set of network connections, wherein:

the update message indicates the current duration of the multimedia content of the live event encoded into streamlets according to the timeline;

the update message further includes real-time control information that indicates a start time and a scheduled duration of an advertisement break in the multimedia content of the live event;

each of the plurality of media players subscribed to the messaging service is configured to request the streamlets of the multimedia content of the live event for delivery over the Internet from the content server based on the current duration to avoid requesting multimedia content occurring after the current duration that is not available for delivery;

each of the plurality of media players subscribed to the messaging service is to play the requested streamlets of the multimedia content of the live event based the real-time control information to allow playback of the multimedia content of the live event at a specified point in time according to the timeline of the live event; and each of the plurality of media players subscribed to the messaging service plays a video during the advertisement break in the timeline that is selected from a plurality of videos, wherein the selected video has a duration in time that is less than the scheduled duration of the advertisement break in the multimedia content of the live event.

2. The messaging server computing device of claim 1, wherein the selected video is selected to reduce an error time in which playback of the multimedia content lags behind the live event.

3. The messaging server computing device of claim 1 wherein the selected video is selected to reduce an error time in which playback of the multimedia content lags behind a minimum possible lag-behind-live value of the multimedia content.

4. The messaging server computing device of claim 1, wherein the subscription request from each of the plurality of media players includes the unique content identifier.

5. A client computing device comprising:

a hardware interface providing a set of one or more network connections to the Internet; and at least one processor operating on the client computing device to implement a media player, wherein the processor communicates with a messaging server through a first network connection of the set of one or more network connections to:

send a subscription request to the messaging server over the first network connection to subscribe to a messaging service for multimedia content of a live event, wherein the multimedia content is being encoded and delivered substantially in real time as the live event is occurring, the subscription request including a unique content identifier for the multimedia content of the live event;

receive an update message for the multimedia content of the live event over the first network connection, the update message indicating a current duration of the multimedia content of the live event that has been encoded into streamlets and stored on a content server, and the update message including real-time control information that indicates a start time and a scheduled duration of an advertisement break in the multimedia content of the live event; and update a timeline of the live event using the current duration and the real-time control information, wherein the timeline of the live event is associated with an anchor point in time and indicates when the streamlets of the multimedia content of the live event are available to be requested for delivery by the content server over the Internet to allow the streamlets of the multimedia content of the live event to be played at a specified point in time according to the timeline of the live event; and wherein the at least one processor of the client computing device is further coupled to the content server through a second network connection of the set of one or more network connections to:

determine what streamlets of the multimedia content of the live event to request for delivery by the content server over the second network connection based on the current duration;

stage the requested streamlets of the multimedia content of the live event into a sequence of streamlets for playback of the multimedia content of the live event according to the timeline of the live event by determining when to play the requested streamlets of the multimedia content of the live event based on the timeline of the live event and the real-time control information;

extract video frames from the sequence of streamlets of the multimedia content of the live event; and decode the video frames and render the decoded video frames as an output to a display;

wherein the at least one processor of the client computing device is further configured to play a digital advertisement during the advertisement break that is selected from a plurality of available advertisements, wherein the selected advertisement has a duration in time that is less than the scheduled duration of the advertisement break in the multimedia content of the live event.

6. The client computing device of claim 5, wherein the real-time control information updates a duration of the multimedia content of the live event specified in the timeline of the live event.

7. The client computing device of claim 5, wherein the selected advertisement is selected to reduce an error time in which playback of the multimedia content lags behind the live event.

8. The client computing device of claim 7, wherein the selected advertisement is selected to reduce an error time in which playback of the multimedia content lags behind a minimum possible lag-behind-live value of the multimedia content.

9. The client computing device of claim 8, wherein at least one of the one or more advertisements comprises a multimedia advertisement.

10. The client computing device of claim 8, wherein at least one of the one or more advertisements comprises a static image to be displayed during at least a portion of the advertisement break.

11. The client computing device of claim 8, wherein the processor selects the selected advertisements for playback by,
sending an advertisement request over the set of network connections to an advertisement decision service (ADS) operating on a remote server; and
receiving, in response to the advertisement request, an identity for each of the one or more advertisements.

12. The client computing device of claim 11, wherein the advertisement request comprises information including at least one of a local time of the media player, one or more keywords, the geographic location of the media player, an Internet Protocol (IP) address, a preference of a user of the media player, or one or more demographics of the user.

13. A computer-implemented method executed by a computing device that comprises a processor, data storage and interface to the Internet, the method comprising:
receiving, by a the computing device over a set of one or more network connections coupled to the Internet via the interface, a subscription request for multimedia content of a live event from each of a plurality of client devices, each respective client device coupled to the Internet and operating as a media player to a user of the client device, wherein the multimedia content is being encoded and delivered substantially in real time as the live event is occurring;
subscribing, by the computing device, the plurality of media players to a messaging service for the multimedia content of the live event by storing an entry in a subscription data store that indicates the respective media player is subscribed to receive updates for a unique content identifier of the multimedia content of the live event;
receiving, by the computing device over one of the set of one or more network connections, an update for the unique content identifier that indicates a current duration of the multimedia content of the live event encoded into streamlets by an encoder and stored on a content server, and that indicates a start time and a scheduled duration of an advertisement break in the multimedia content of the live event; and
in response to receiving the update for the unique content identifier:
performing, by the computing device, a lookup operation in the subscription data store using the unique content identifier to determine which of the plurality of media players are subscribed to the messaging service for the multimedia content of the live event; and
sending, by the computing device to each of the plurality of subscribed media players over the set of network connections, an update message that indicates the current duration of the multimedia content of the live event encoded into streamlets and includes real-time control information, wherein:
each of the plurality of subscribed media players requests the streamlets of the multimedia content of the live event for delivery over the Internet by the content server based on the current duration to avoid requesting multimedia content that is not available for delivery;
each of the plurality of subscribed media players is to play the requested streamlets of the multimedia content of the live event based the real-time control information to allow playback of the multimedia content of the live event at a specified point in time according to a timeline of the live event that is associated with an anchor point in time; and
each of the plurality of subscribed media players is further configured to play a digital advertisement during the advertisement break that is selected from a plurality of available advertisements, wherein the selected advertisement has a duration in time that is shorter than the scheduled duration of the advertisement break in the multimedia content of the live event.

14. A computer-implemented method executed by a client device that comprises a processor, data storage and interface to the Internet, the method comprising:
requesting, by a media player operating on the client device coupled to the Internet subscribed to a messaging service for multimedia content of a live event, an encoded portion of the multimedia content of the live event from a content server over a first set of one or more network connections to the Internet via the interface according to a timeline of the live event, wherein the multimedia content is being encoded and delivered substantially in real time as the live event is occurring, and wherein the timeline of the live event is associated with an anchor point in time and indicates when the encoded portion of the multimedia content of the live event is to be played by the media player according to a schedule of the live event;
receiving, by the media player, an update message from the messaging service over at least one of the first set of network connections to update the timeline of the live event, wherein the update message includes real-time control information and indicates when a subsequent encoded portion of the multimedia content of the live event is available for delivery by the content server over the Internet, and that further indicates a start time and a scheduled duration of an advertisement break in the multimedia content of the live event;
updating, by the media player, the timeline of the live event using the real-time control information, the timeline of the live event indicating when to play the subsequent encoded portion of the multimedia content of the live event according to the schedule of the live event; and
requesting, by the media player, the subsequent encoded portion of the multimedia content of the live event for delivery by the content server over the set of one or more network connections for playback according to the updated timeline of the live event, wherein the client device plays a digital advertisement during the advertisement break that is selected from a plurality of available advertisements, wherein the selected advertisement has a duration in time that is shorter than the advertisement break in the multimedia content of the live event.

15. The method of claim 14, wherein the method further comprises sending a subscription request to a messaging server to subscribe the media player to the messaging service for the multimedia content of the live event.

16. The method of claim 14, wherein said updating comprises updating a specified duration of the multimedia content of the live event using the real-time control information in the update message.

17. A computer-implemented method performed by a messaging server device having a processor, a digital data storage and a hardware interface to the Internet, the method comprising:
- receiving, by the messaging server device over a set of one or more network connections coupled to the Internet via the hardware interface, a subscription request for multimedia content of a live event from each of a plurality of client devices, each client device coupled to the Internet and providing a media player to a user of the client device, wherein the multimedia content is being encoded and delivered substantially in real time as the live event is occurring;
- subscribing, by the messaging server device, each respective media player of the plurality of client devices to a messaging service for the multimedia content of the live event using a unique content identifier for the multimedia content of the live event;
- receiving, by the messaging server device, an update that indicates a current duration of an encoded portion of the multimedia content of the live event stored by a content server according to a timeline that is associated with an anchor point in time and that indicates a start time and a scheduled duration of an advertisement break in the multimedia content of the live event; and
- sending, by the messaging server device to each of the plurality of media players subscribed to the messaging service over the set of network connections, an update message that indicates the current duration of the encoded portion of the multimedia content of the live event available for delivery by the content server and includes real-time control information, wherein:
  - each of the plurality of media players is to request the encoded portion of the multimedia content of the live event for delivery over the Internet from the content server based on the current duration and the real-time control information to allow the encoded portion of the multimedia content of the live event to be played on its respective client device at a specified point in time according to a timeline of the live event; and
  - wherein each of the plurality of media players plays a digital advertisement during the advertisement break that is selected from a plurality of available advertisements for that media player, wherein the selected advertisement has a duration in time that is shorter than the advertisement break in the multimedia content of the live event to thereby reduce an error time for that media player, wherein the error time indicates a delay in playback after a minimum possible lag-behind-live value of the multimedia content.

18. The method of claim 17, wherein said sending the update message comprises sending the updated timeline of the live event to each of the plurality of subscribed media players.

19. The method of claim 17, wherein the method further comprises:
- upon receiving the update, performing a lookup operation in a subscription data store using the unique content identifier (UCID) to determine which of the plurality of media players are subscribed to the messaging service for the UCID; and
- sending the update message to each of the plurality of media players that is subscribed to the messaging service for the UCID.

20. A data processing system comprising:
- a set of one or more hardware encoders to receive multimedia content of a live event, to encode portions of the multimedia content of the live event into streamlets, and to store the streamlets on a content server, wherein the multimedia content is received and encoded substantially in real time as the live event is occurring;
- a messaging server system having a processor and an interface that is coupled to the Internet over a first set of one or more network connections to receive updates that indicate a current duration of the portions of the multimedia content of the live event encoded and stored on the content server and provide update messages that include real-time control information that indicates the current duration of the encoded portions of the multimedia content of the live event available for delivery by the content server over the Internet according to a timeline that is associated with an anchor point in time, and that indicates a start time and a scheduled duration of an advertisement break in the multimedia content of the live event; and
- a plurality of client devices, each configured as a media player and coupled to the Internet via a second set of one or more network connections, each client device configured to:
  - receive the update messages from the messaging server over the second set of network connections to update a timeline of the live event using the current duration and the real-time control information, wherein the timeline of the live event is associated with an anchor point in time and indicates when the encoded portion of the multimedia content of the live event is to be played by the respective media player at a specified point in time according to the timeline of the live event;
  - determine what streamlets to request for delivery by the content server over the second set of network connections and determine when to play the requested streamlets of the multimedia content of the live event based on the timeline of the live event to allow the multimedia content of the live event to be played by the respective media player according to the timeline of the live event; and
  - play a digital advertisement during the advertisement break that is selected from a plurality of available advertisements for that media player, wherein the selected advertisement has a duration in time that is shorter than the advertisement break in the multimedia content of the live event to thereby reduce an error time for that media player, wherein the error time indicates a delay in playback after a minimum possible lag-behind-live value of the multimedia content.

21. The data processing system of claim 20, further comprising:
- a publishing system that receives information from the set of encoders that indicates when the encoded multimedia content is available for delivery and generates the updates in response to the received information.

22. The data processing system of claim 21, wherein the messaging server comprises:
- a subscription manager that receives through the first set of network connections a subscription request from each of the plurality of media players to subscribe the respective media player to a messaging service for the multimedia content of the live event; and an update manager that receives through the first set of network connections the updates from the publishing system.

23. The data processing system of claim 22, further comprising a data storage device configured to store subscription data, wherein the processor, upon receiving a current update, performs a lookup operation in the subscription data to determine which of the plurality of media players are subscribed to the messaging service for the multimedia content of the live event, and sends the current update to each of the plurality of media players that is subscribed to the messaging service for the multimedia content of the live event.

24. The messaging server computing device of claim 1, wherein the anchor point in time comprises a time when the encoding of the live event began.

25. The client computing device of claim 5, wherein the anchor point in time comprises a time when the encoding of the live event began.

26. The data processing system of claim 20, wherein the anchor point in time comprises a time when the encoding of the live event began.

* * * * *